United States Patent [19]

Chenoweth et al.

[11] Patent Number: 4,472,780
[45] Date of Patent: Sep. 18, 1984

[54] FLY-BY-WIRE LATERAL CONTROL SYSTEM

[75] Inventors: Charles C. Chenoweth, Renton; Imre J. Takats, Bellevue, both of Wash.

[73] Assignee: The Boeing Company, Seattle, Wash.

[21] Appl. No.: 306,381

[22] Filed: Sep. 28, 1981

[51] Int. Cl.³ ............................ G05D 1/08; G06F 11/18
[52] U.S. Cl. ...................................... 364/434; 364/187; 371/68; 318/564; 244/194
[58] Field of Search ........................ 364/434, 439, 187; 371/8, 11, 68; 318/563, 564, 580, 585; 244/90 A, 90 R, 194

[56] References Cited

U.S. PATENT DOCUMENTS

| | | | |
|---|---|---|---|
| 2,366,734 | 1/1945 | Lear | 244/113 |
| 2,652,995 | 9/1953 | Swain et al. | 244/194 |
| 3,027,878 | 4/1962 | Keyt et al. | 91/453 |
| 3,339,866 | 9/1967 | Paluka et al. | 244/113 |
| 3,429,226 | 2/1969 | Rasmussen | 91/368 |
| 3,505,929 | 4/1970 | Coppola et al. | 318/564 |
| 3,551,776 | 12/1970 | Tawfik et al. | 244/194 |
| 3,614,401 | 10/1971 | Lode | 318/564 |
| 3,618,880 | 11/1971 | Hagaman | 244/113 |
| 3,787,009 | 1/1974 | Wheldon | 244/217 |
| 4,039,162 | 8/1977 | Calhoun et al. | 244/90 A |
| 4,087,065 | 5/1978 | Arnquist et al. | 244/113 |
| 4,130,241 | 12/1978 | Meredith et al. | 318/564 |
| 4,143,839 | 3/1979 | Antonov et al. | 244/90 A |
| 4,159,444 | 6/1979 | Bartlett et al. | 318/564 |
| 4,327,437 | 4/1982 | Gelderloos | 318/564 |
| 4,345,191 | 8/1982 | Takats et al. | 318/564 |
| 4,363,098 | 12/1982 | Buus et al. | 364/187 |
| 4,370,706 | 1/1983 | Doniger et al. | 244/194 |

Primary Examiner—Gary Chin
Attorney, Agent, or Firm—Delbert J. Barnard

[57] ABSTRACT

Each wing of an aircraft carries a set of five outboard spoilers, one inboard spoiler, one inboard aileron and one outboard aileron, together constituting the lateral control surfaces for the aircraft. Each spoiler is positioned by means of a single thread electrohydraulic servoactuator. Each outboard aileron is positioned by means of a one/one fail-operational electrohydraulic servoactuator. Each inboard aileron is positioned by a two/one fail-operational, electrohydraulic servoactuator. The control system is operated by four independent electrical control signal processing channels and four independent hydraulic pressure supplies. A distribution pattern of the various lateral control surfaces on the aircraft, and an association pattern of the hydraulic pressure supplies and the electric control signal processing channels to the actuators, results in the lateral control system being operable after three electric channel failures, or three hydraulic pressure supply failures, or a combination of three electric channel and three hydraulic pressure supply failures.

36 Claims, 11 Drawing Figures

FLY-BY-WIRE LATERAL CONTROL SYSTEM

DESCRIPTION

1. Technical Field

The present invention relates to the provision of a highly fault-tolerant lateral control system for an aircraft, utilizing advanced Fly-By-Wire actuation controls with improved failure detection, reconfiguration, and redundancy management techniques not previously used. More particularly, it relates to the provision of such a system that will continue to operate safely after three electrical failures, or after three hydraulic failures, or after a combination of three electrical and three hydraulic failures. The control system of this invention provides improved performance and design flexibility and saves weight and cost without sacrificing functional reliability.

2. Background of the Invention

As is well known to those persons skilled in the art to which the present invention relates, the term "Fly-By-Wire" as used herein is the name given to a control system in which control commands of a pilot are transformed into electrical signals which are transmitted by electrical wires to electrical and/or electrohydraulic actuators which are connected to the control surfaces. The term "lateral control surfaces" refers to movable aerodynamic surfaces which are operable for "roll" control of the aircraft. This function is primarily provided by surface or flaps known as "ailerons" which are located at the trailing edges of the wings. However, large commercial and military aircraft also include other surfaces on their wings which are termed "spoilers". These surfaces are operational to both alter the aerodynamic character of the wings in an unsymmetric manner for roll control and in a symmetric manner as aerodynamic brakes. The particular "spoilers" which are used for the braking function are commonly termed "speed brakes". It is common to use "spoilers" in place of or in conjunction with "ailerons", for roll control of the aircraft. Thus, the term "lateral control surfaces" is a commonly employed generic term for both the "ailerons" and "spoilers".

Safety of flight is a major concern in aviation. That concern is most apparent in the aircraft flight control system. The purpose of most flight control systems is to translate commands from the pilot, autopilot, and other automatic controls to provide aircraft surface control. To date a multiple of implementation techniques have been utilized to produce systems of varying capability in terms of safety and reliability. These have included various forms of redundancy management in terms of hardware duplication of like components with and without failure monitoring and switching or averaging for fault tolerance. Some of these techniques have been more or less successful in their application.

The present flight control systems for large commercial and military airplanes use mechanical primary flight controls, where the pilots control commands are transmitted through a conventional mechanical cable and linkage system as mechanical motions and the outputs are amplified by hydromechanical servoactuators. Additionally, this primary control system has to transmit the output signals from the Automatic Flight Control System (AFCS) and the Electrical Flight Control System (EFCS). To achieve that, the electrical control signals have to be transformed into mechanical motions and integrated by complex mechanical mechanisms.

Overall system performance of this type conventional control system is only as good as its poorest performing element, which in this case is the complex mechanical cable and linkage system. With introduction of Active Control Technology (ACT), such as stability augmentation, load alleviation, and flutter suppression, the need for performance improvement, design flexibility and design compatability of the primary flight controls is further increased.

All these requirements direct our attention to the desirability of Fly-By-Wire (FBW) controls as replacements for the mechanical primary flight controls with a more advanced control system but without sacrificing aircraft safety.

Studies have shown that FBW controls can provide improved flexibility, performance, and design compatability with other electrical controls and can provide weight and cost savings without reducing functional reliability and fail-operational capability with respect to conventional mechanical controls. This was the motivation behind the control concept of the present invention. The high fail-operational capability and functional reliability needed for FBW controls can be achieved with advanced failure detection, reconfiguration and redundancy management techniques not previously used. A control has been developed by us, wherein these methods are used in connection with component and surface redundancies to maximize the fail-operational capability and functional reliability and minimize weight and cost.

The control system of this invention provides a high fail-operational capability and functional reliability with minimum weight and cost.

The concept of this FBW Lateral Control System utilizes hardware redundancy as well as analytical redundancy. Hardware redundancy exists by virtue of hardware duplication. Analytical redundancy exists by virtue of utilizing dissimilar elements and knowledge of the dynamic behavior of the system. The process is successfully accomplished by uniquely combining these redundancies through a multi-channel control distribution technique and failure detection technique. Additionally, optimization of the levels of actuation redundancies for the different control surfaces has been achieved to minimize weight and cost.

The following United States patents disclose various redundancy control systems which are known in the patent literature: U.S. Pat. No. 2,366,734, granted Jan. 9, 1945 to W. P. Lear, No 2,652,995, granted Sept. 22, 1953, to A. E. Swain et al, No. 3,027,878, Apr. 3, 1962 to F. G. Keyt et al, No. 3,339,866, granted Sept. 5, 1967 to C. F. Paluka et al, No. 3,429,226, granted Feb. 25, 1969 to R. F. Rasmussen, No. 3,505,929, granted Apr. 14, 1970 to P. S. Coppola et al, No. 3,614,401, granted Oct. 19, 1971 to T. D. Lode, No. 3,618,880, granted Nov. 9, 1971 to E. A. Hagaman, No. 3,787,009, granted Jan. 22, 1974 to W. G. Wheldon, No. 4,039,162, granted Aug. 2, 1977 to J. T. Calhoun, No. 4,087,065, No. 4,087,065, granted May 2, 1978 to W. D. Arnquist, No. 4,130,241, granted Dec. 19, 1978 to J. F. Meredith et al, No. 4,143,839, granted Mar. 13, 1979 to O. K. Antonov et al.

DISCLOSURE OF THE INVENTION

A basic fly-by-wire lateral control system, incorporating the present invention, includes four separate hydraulic power sources and four separate electric control signal command channels. Two of the hydraulic power supplies are connected to a first redundant electrohydraulic actuator for a lateral control surface located on one wing of an aircraft. The other two hydraulic power supplies are connected to a second redundant actuator which operates an identical lateral control surface located on the opposite wing of the aircraft. Together the two redundant actuators comprise four separate linear hydraulic actuating devices (hereinafter referred to as actuator sections). Each one of the four hydraulic pressure supplies is connected individually to each separate section. Two of the electric control signal command channels are "active" control channels for a first one of the actuators and are "model" channels for the second actuator. The other two electrical control signal processing channels are "active" channels for the second actuator and are "model" channels for the first actuator. Each actuator includes a control means which operates to continue operation of one section of the actuator following two electrical signal processing channel failures and/or one hydraulic pressure supply failure. The association pattern of the hydraulic pressure supplies and the electric control signal command channels to the four actuator sections results in one of the lateral control surfaces being operable after three electric channel failures or three hydraulic pressure supply failures, or a combination of three electrical channel and three hydraulic pressure supply failures.

According to another aspect of the invention, the above described pair of actuators and their control means are accompanied on the aircraft by additional lateral control surfaces, each of which is controlled by an electrohydraulic actuator. The hydraulic pressure supplies and the electric control signal command channels are associated with the actuators for the additional lateral control surfaces in such a manner that a failure of any hydraulic supply or any electric control signal command channel would result in only a portion of the additional lateral control system being disabled, with the remaining additional control surfaces continuing to operate for imparting roll corrections to the aircraft.

Other aspects of the invention are hereinafter described in connection with the illustrated embodiment of the invention, and are defined in the appended claims. These include specific patterns of lateral control surfaces and specific distributions of the hydraulic pressure supplies and the electrical control signal command channels to the actuators or actuator sections for the various lateral control systems.

BRIEF DESCRIPTION OF THE DRAWING FIGURES

DESCRIPTION OF THE PREFERRED EMBODIMENT

The lateral and speed brake control system is operated by four independent electrical control signal command channels and four independent hydraulic pressure supplies. Herein the numerals I, II, III and IV are used to designate the four electrical control signal command channels. The letters, A, B, C, D are used to designate the four independent hydraulic pressure supplies.

The expression "control unit" is used herein to describe the complete control loop in the overall control system made by a single electrical channel and the failure monitoring and switching over logic for such channel. Each hydraulic pressure supply A, B, C, D has associated with it a pressure supply line and a return line.

Figure 1:
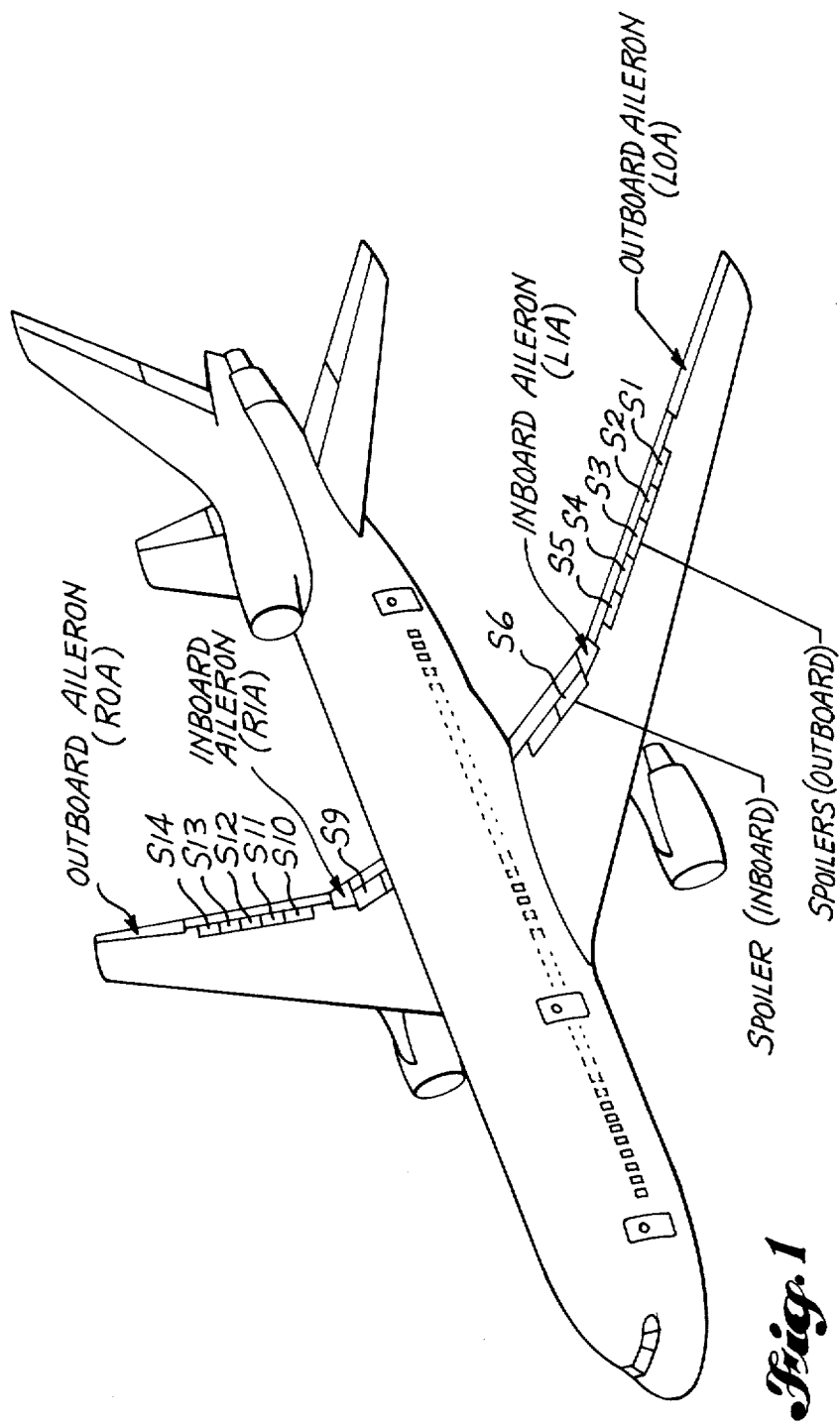
FIG. 1 is a pictorial view of an aircraft embodying a fly-by-wire lateral control system constructed in accordance with the present invention, showing a preferred pattern of spoilers and ailerons on the wings of the aircraft.

The lateral control surfaces on the aircraft shown in FIG. 1 comprise on each wing of the aircraft, five outboard spoilers (S1, S2, S3, S4, S5 and S10, S11, S12, S13, S14), one inboard spoiler (S6 and S9), one outboard aileron and one inboard aileron. The wings also include other flaps or control surfaces which perform other than lateral control functions and for this reason will not be described.

Figure 3:
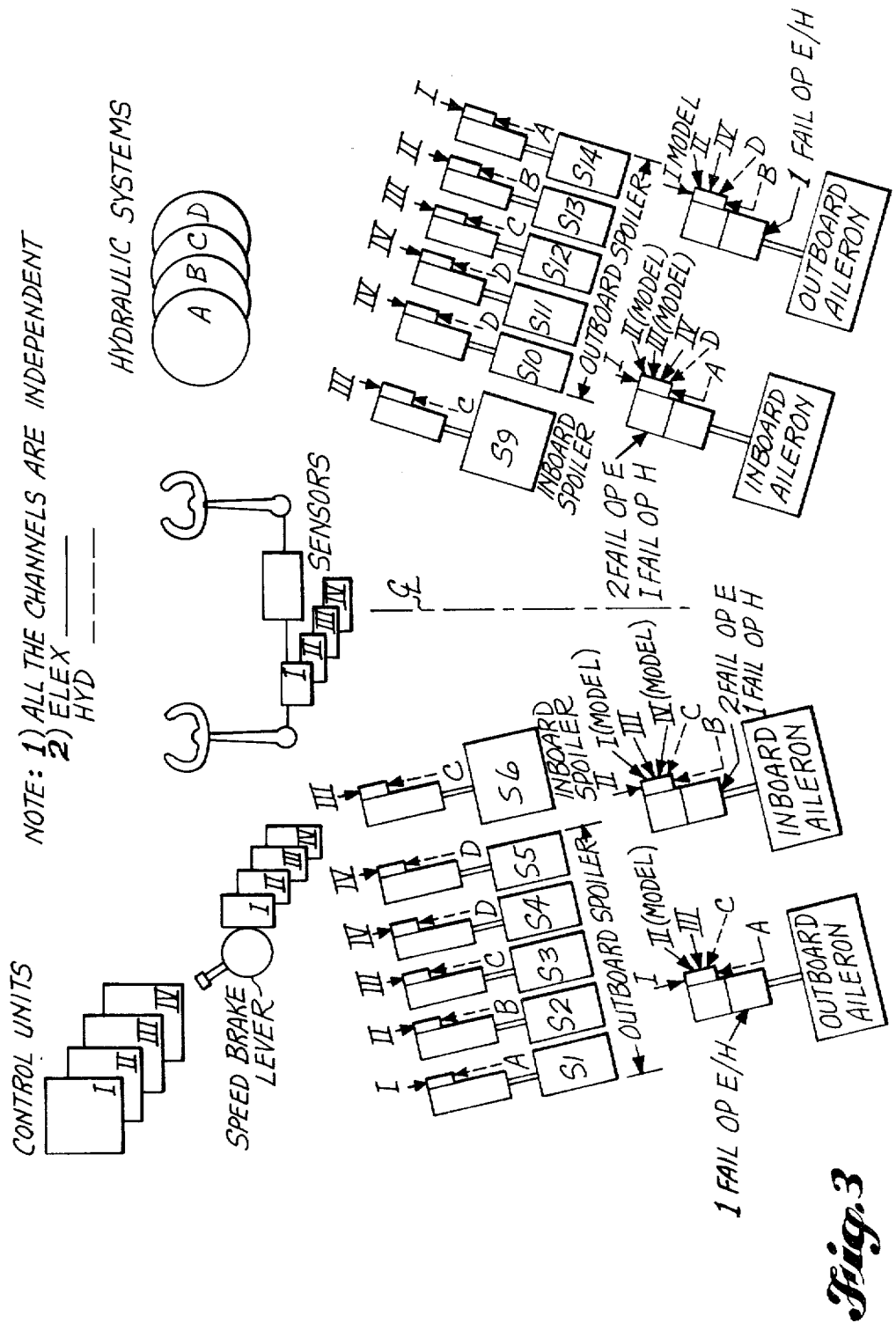
FIG. 3 is a schematic view of the lateral control components of an aircraft, showing a preferred association of the hydraulic pressure supplies and the electrical control signal command channels with the various lateral control surfaces on the aircraft.

As schematically shown by FIG. 3, each of the six spoiler surfaces per wing is operated by a separate single thread electrohydraulic servoactuator. The distribution of electrical control signal command channels and hydraulic pressure supplies to the spoilers is symmetrical, such that any single electrical channel or pressure supply failure would result in a loss of symmetrical surfaces. For example, a failure of electrical channel I and/or hydraulic pressure A would result in a simultaneous failure of the outermost outboard spoiler on each wing of the aircraft. These two spoilers are designated S1 and S14 in FIG. 3. By way of further example, a failure of electrical channel III and/or hydraulic pressure C would result in a loss of both the outboard spoilers S3 and S12 and the two inboard spoilers S6 and S9.

Figure 4:
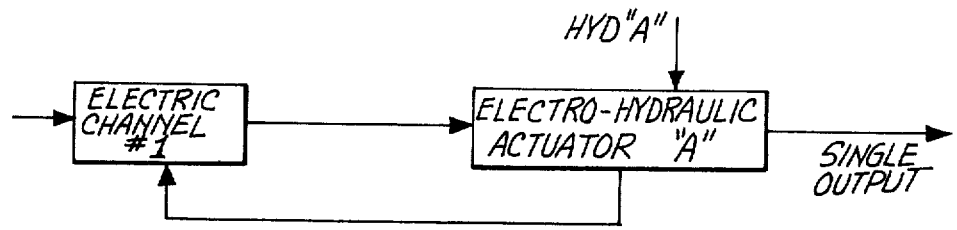
FIG. 4 is a block diagram of a conventional single thread electrohydraulic actuator.
Figure 5:
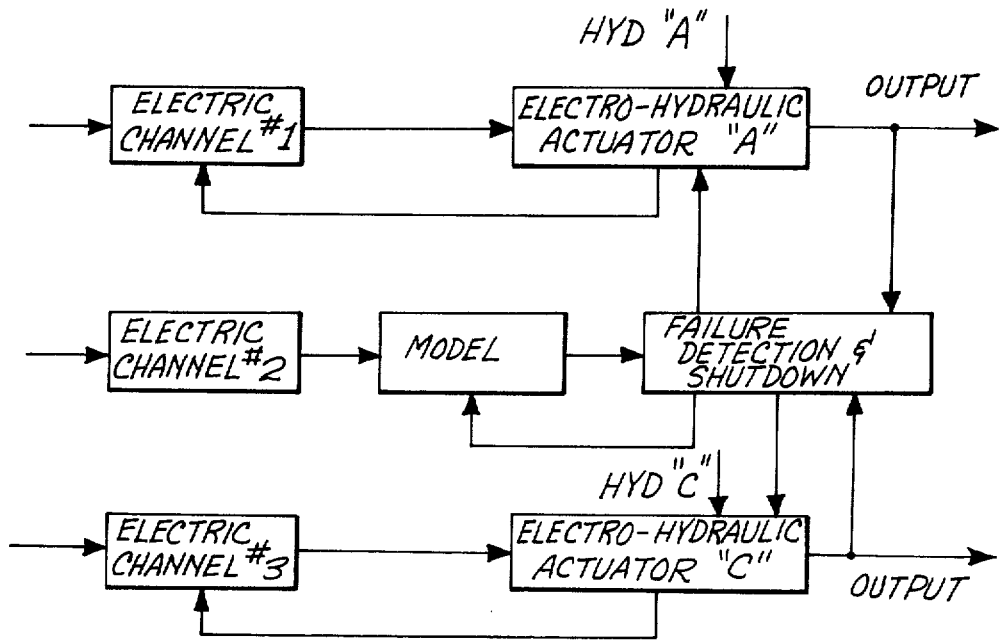
FIG. 5 is a block diagram of a one/one fail-operational redundant actuator of a type associated with each outboard aileron in the preferred embodiment of the invention.

FIG. 4 is a block diagram of a single thread hydraulic servoactuator of the type used for positioning the outboard spoilers S1 and S14. The same type of actuator mechanism is used for positioning spoilers S2, S3, S4, S5, S6, S9, S10, S11, S12, and S13, the only difference being in the identity of the hydraulic pressure supply line and the electrical control signal command channel that is asociated with each actuator.

In accordance with a preferred embodiment of the invention, a conventional one/one fail-operational redundant actuator is connected to each outboard aileron. FIG. 1 is a block diagram of such as actuator. The particular actuator that is illustrated is the actuator connected to the outboard aileron on the left wing. It is shown to be associated with channels I and III, as active channels and channel II as a single model channel, and with hydraulic supplies B and C. The actuator for the outboard aileron on the right wing is identical except that its active channels are II and IV, its model channel is I, and its associated hydraulic pressure supplies are B and D. The operation of this type of actuator is known and therefore will not be described in greater detail.

In accordance with the present invention, each inboard aileron is positioned by means of a two/two fail-operational redundant actuator of the type disclosed and claimed in our co-pending U.S. application Ser. No. 175,687, entitled Two/One (2/1) Fail Operational Electrohydraulic Servoactuator, now U.S. Pat. No. 4,345,191, granted Aug. 17, 1982.

Figure 6:
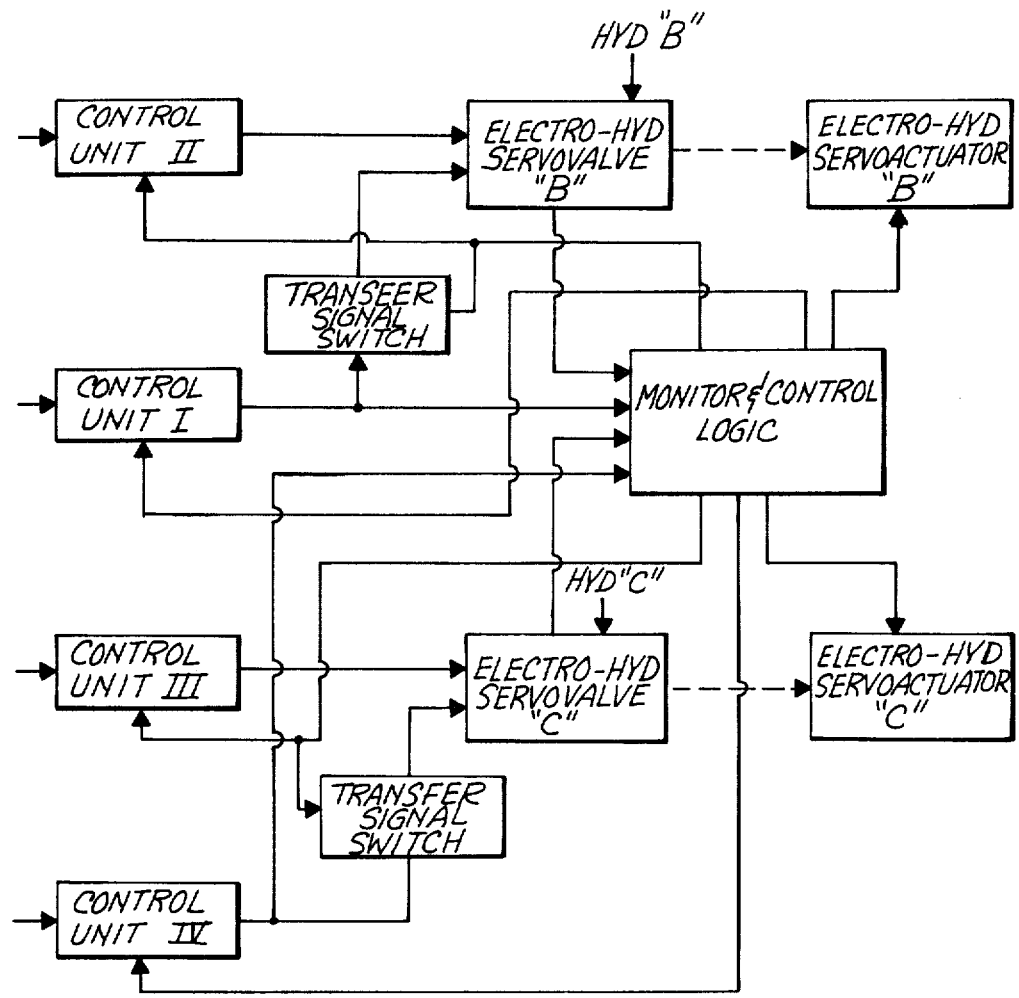
FIG. 6 is a block diagram of an embodiment of a two/one fail-operational redundant actuator of the type which is associated with each inboard aileron in the preferred embodiment of the invention.

FIG. 6 is a block diagram of the actuator for the inboard aileron on the left wing. It is shown to be associated with channels II and III as active channels, with channels I and IV as model channels, and with hydraulic supplies B and C. The actuator for the inboard aileron on the right wing is identical except that its active channels are channels I and IV, its model channels are channels II and III, and its associated hydraulic pressure supplies are A and D.

Figure 7:
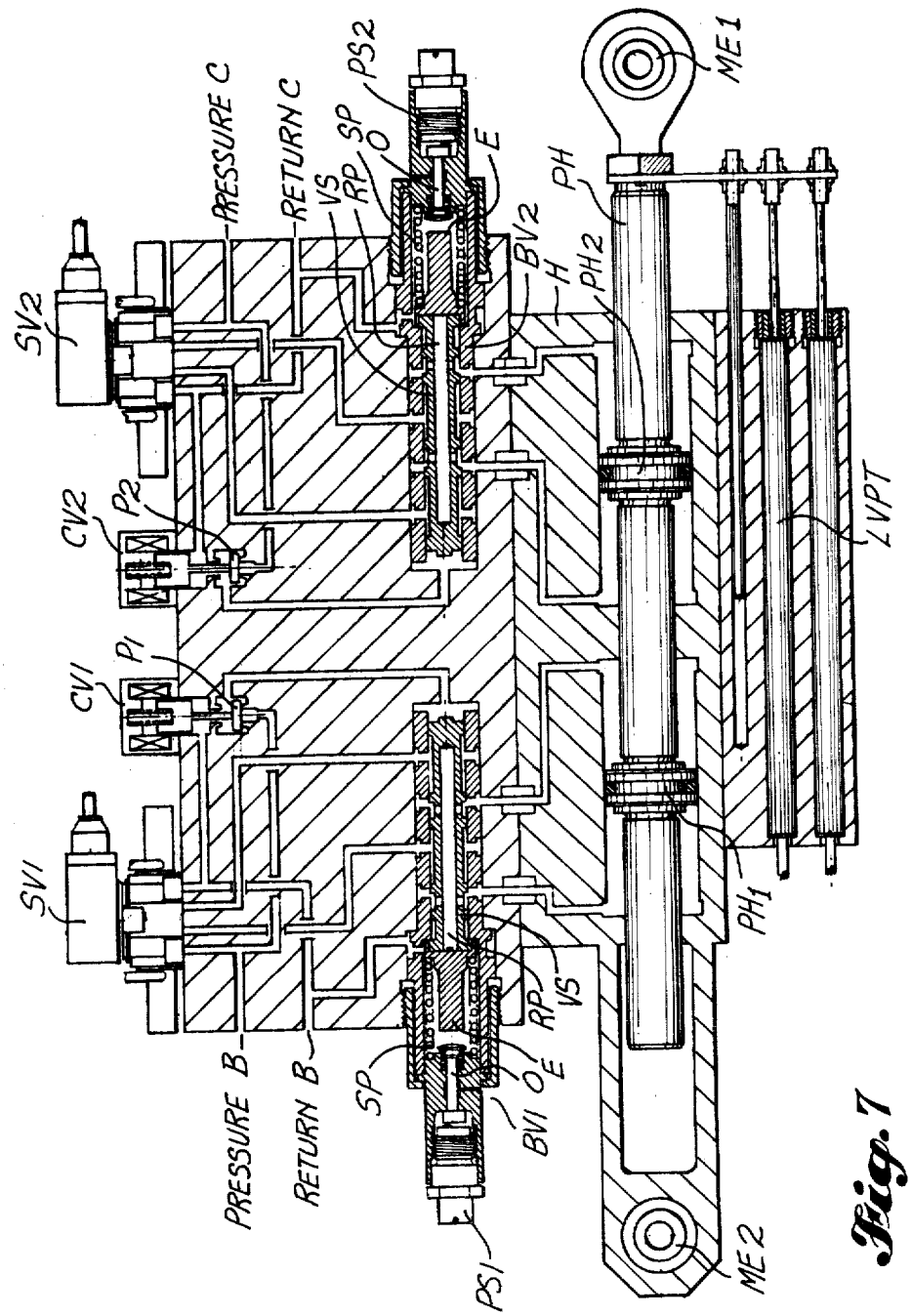
FIG. 7 is a schematic view of a dual or redundant actuator and associated hydraulic and electrical components which are present in both the one/one fail-operational actuator and the two/one fail-operational actuator, such view showing some parts in section and others in elevation and showing both sections in a disabled position.
Figure 8:
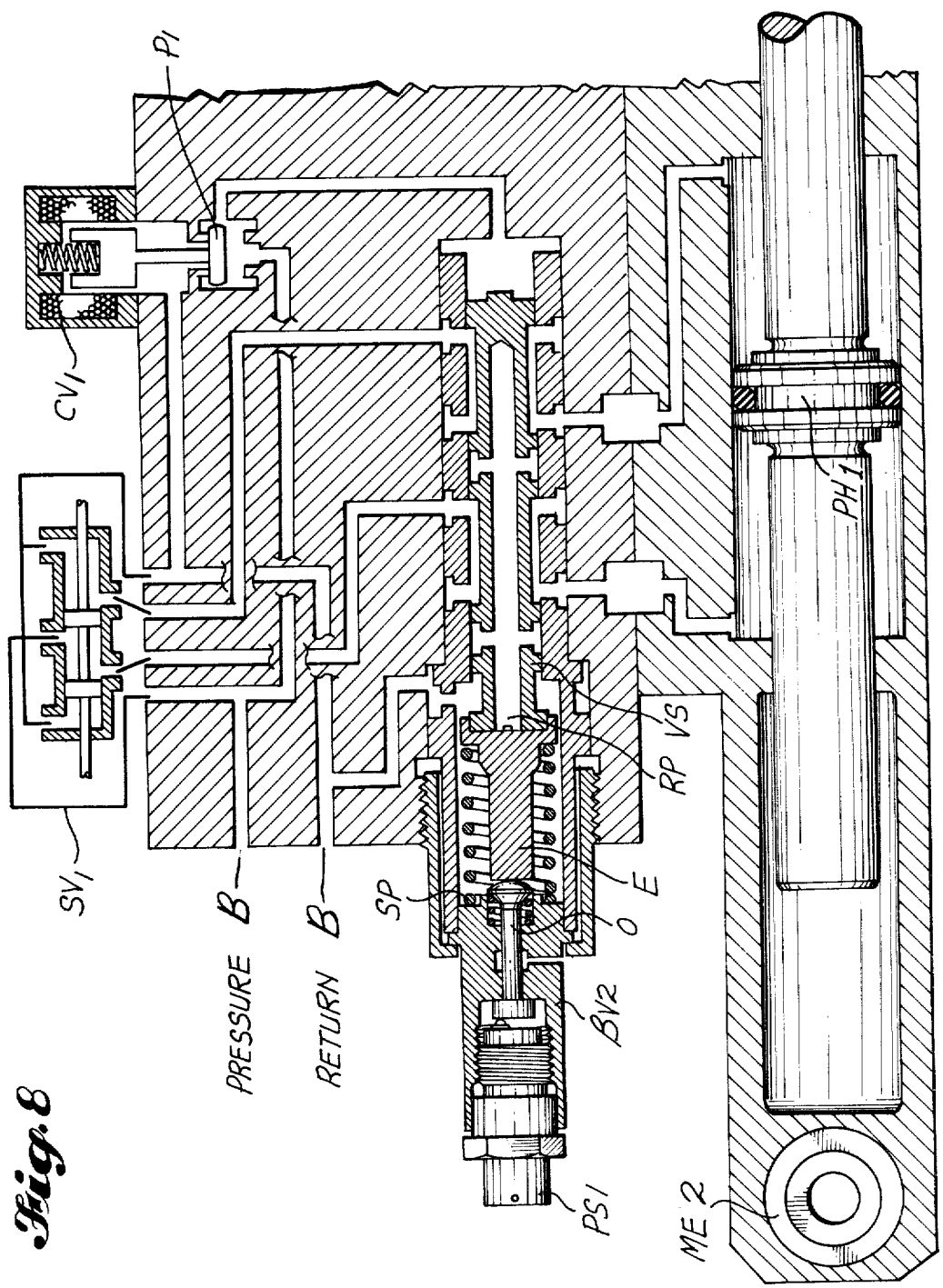
FIG. 8 is an enlarged scale fragmentary view of one section of the actuator shown by FIG. 7, with the bypass valve for such section shown in its active position.

FIGS. 7 and 8 are hydraulic schematic diagrams of a dual or redundant actuator of the type which is associated with each aileron, together with the control valve components which make it operational, and transducer (LVDT) feedback devices. The actuator is either a one/one fail-operational actuator or a two/one fail-operational actuator, depending on its control circuitry.

As shown, each such actuator comprises a housing H defining an axially aligned pair of substantially identical linear hydraulic actuating devices. Each actuator or hydraulic section comprises a cylinder. The actuator comprises a single piston rod PR which includes two piston heads PH1, PH2, one located within each cylinder.

A first mounting eye ME1 is provided at the outer end of the piston rod PR. A second mounting eye ME2 is carried by the housing H at the opposite end of the actuator.

Each piston head and the cylinder within which it is located constitutes a separate hydraulic section of the actuator. Each piston head divides its hydraulic section into two chambers, one on each side of the piston head. Each chamber includes a combined inlet-outlet at its outer end.

A servovalve, a bypass control valve, a bypass valve and a bypass valve position switch associated with each section of the actuator is provided.

The particular actuator that is shown by FIGS. 7 and 8 is the actuator provided for controlling the leftwing inboard aileron. Hence, one of its sections is connected to hydraulic pressure supply line B and the other section is connected to hydraulic pressure supply line C.

In FIG. 7 both hydraulic sections are in a passive condition. An inspection of FIG. 7 will show that when the valve plug P in the bypass control valve CV of either section is out, such section is hydraulically bypassed and becomes passive. When such control plug is in, the section becomes active (FIG. 8).

Each bypass control valve CV1, CV2 includes a spring biasing its valve plug P outwardly and an electrical coil for pulling the valve plug P inwardly. When a valve plug $P_1$ is in (FIG. 8), hydraulic pressure from the pressure line is communicated to the inner end of the bypass valve BV1, whereat it exerts a pressure on the inner end of a valve spool VS, forcing such valve spool endwise outwardly in opposition to a position spring which acts on an outer end portion of the valve spool VS, to normally bias it inwardly.

A position switch PS1, PS2 is provided at the outboard end of each bypass valve. Each such switch PS1, PS2 includes an operator O which is contacted by an outboard end portion E of the valve spool VA. Hydraulic pressure acting on the inboard end of the valve spool will continue to move it endwise outwardly until the operator O of the switch PS1, PS2 has been moved against a stop. At that time, the valve spool of the bypass valve is in an active position and the switch operator O has been depressed. The switch PS1, PS2 operates to energize a signal light or some other indicator so that indication is presented that the bypass valve BV1, BV2 is in the active position.

As shown in FIG. 8, when the bypass valve is in its active position, galley portions of the valve spool provide interconnecting passageways between the cylinder chambers and the servovalve SV1 on opposite sides of the bypass valve BV1. When the bypass valve spool VS is in its passive position (FIG. 7), the servovalve SV1 connecting passageways are blocked at the bypass valve by land portions of the valve spool VS and the two cylinder chamber lines are both interconnected via a central passageway RP in the valve spool VS. Hence, the actuator section is bypassed and becomes passive.

FIG. 7 shows a single pair of LVDT units in the foreground. However, as will hereinafter be described, the actuator includes four such units, two of which are associated with each section of the actuator.

When a bypass valve BV is in its active position, the servovalve SV1, SV2 for such section functions as both a four way valve and a meter valve. It directs pressure into one chamber while communicating the second chamber with the return line. It also controls the rate of movement of the movable component of the actuator relative to the fixed component. Thus, it establishes both the rate and direction of movement of the control surface to which such actuator is connected.

The following is a detailed description of a two/one fail-operational electrohydraulic servoactuator (hereinafter simply "actuator"). Such description is identical to the description which appears in our aforementioned U.S. Pat. No. 4,345,191 except that it is related to the actuator for the inboard aileron on the left wing of the aircraft.

Referring to FIG. 6, electrohydraulic servoactuator sections "B" and "C" are controlled by electrohydraulic servovalves "B" and "C", respectively (the letter designation being that of the associated hydraulic line). The amount that the servovalve is opened or closed will determine the rate at which the servoactuator sections change position. Servovalves "B" and "C" are connected to hydraulic lines or systems "B" and "C", respectively. Each of the servovalves provides a rate indicative output to the Monitor and Control Logic which is compared with the outputs of electric channels I and IV. If one of the inputs to the monitor and control logic differs from the other three inputs by more than a predetermined amount, the Monitor and Control Logic will catagorize that input as indicative of a failed channel and will provide the appropriate corrective control signal. As can be seen, outputs are provided to each channel, the transfer switch and the hydraulic servoactuator section itself, in the systems associated with each of both servoactuator sections. For example, if either channel II or channel III "fails", the Monitor and Control Logic will provide a control signal to the channel disabling it and also to its respective transfer signal switch which has the effect of connecting either channel I or channel IV to control either servovalve "B" or servovalve "C", respectively. At this point because channel I or channel IV is directly controlling servovalve "B" or "C" the rate indicative output from the controlled servovalve is now indicative of the output of channel I or IV. Accordingly, the Monitor and Control Logic disregards the actual output of channels I or IV and instead categorizes the rate indicative output from the servovalve as the output from channels I or IV and ignores the fact that this rate indicative output was initially regarded as indicative of the condition of channel II or III, which has subsequently failed.

If either channel I or channel IV is the "failed" channel, after comparison, the Monitor and Control Logic merely disables the failed channel and its output, which was compared with the three remaining "good" channels.

In the event that both electric channels associated with servovalve "B" fail, the Monitor and Control Logic in addition to disabling the two channels, also sends a signal to servoactuator section "B" opening a bypass valve or actuating a friction brake depending on whether the servoactuators are connected in parallel or in a differential summing manner, respectively. This permits the remaining servoactuator to provide proper operation without the failed actuator hindering such proper operation.

Failure of either hydraulic system or the servovalve itself would provide a rate indicative output which would differ from the remaining three outputs being compared by the Monitor and Control Logic. Because channel II is initially associated with the servovalve rate indicative output, the Monitor and Control Logic would operate under the assumption that electric channel II has failed consequently disconnecting it from the servovalve and connecting electric channel I thereto. However, because electric channel I, after disconnection of electric channel II, provides a rate indicative output directly from servovalve "B" and because this same rate indicative output (now identified with channel I) still indicates a failed channel, the Monitor and Control Logic would shut down electric channel I as well and actuate the servoactuator "B" bypass or friction brake as required.

Thus, the use of four channels and the multiple "voting" among "rate" outputs thereof, combined with two separate hydraulic and servoactuator systems, provides a two/one fail-operational servoactuator system without the necessity of three servoactuators, and a complex "position" indicative outputs. Precisely how one embodiment of the present invention operates will be reviewed with reference to FIG. 9.

Figure 9:
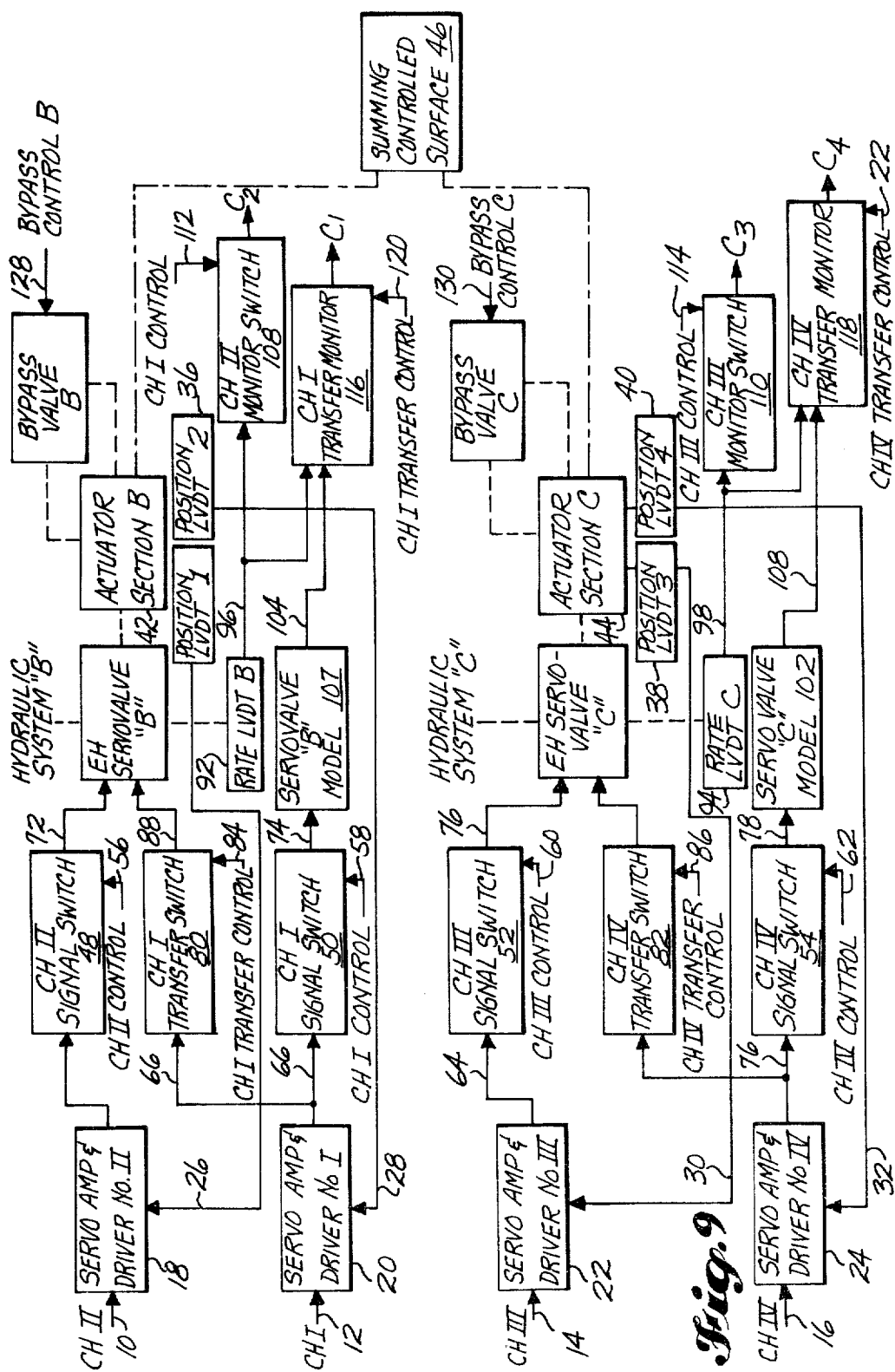
FIG. 9 is a block diagram of a first control system for a two/one fail-operational redundant actuator without the monitor and control logic.

An electrical input 10, 12, 14, 16 is supplied to channels II, I, III and IV, respectively, as shown in FIG. 9. These inputs may be electrically connected to each other or may be derived from separate, redundant control transducers, for example mounted on the pilot's control stick. Regardless of the origin of electrical inputs 10, 12, 14, 16, they are assumed to be substantially equal when applied to the inputs of servo amp and drivers 18, 20, 22 and 24. Also applied to the servo amp and drivers are actual position feedback signals 26, 28, 30, 32 which are generated, for example, by position Linear Variable Differential Transformers (LVDTs) 34, 188, 36, 190, 38, 192, 40, 194 corresponding to the four electrical channels.

As noted on FIG. 9, the solid lines indicate an electrical connection, the dotted lines indicate a hydraulic connection and the dot-dash lines indicate a mechanical connection. Each servoactuator section 42 and 44, has two LVDTs mechanically connected thereto so as to provide two actual position feedback signals one for each channel associated with the actuator. As is well known in servoactuator control, the electrical input signal in each channel is compared with the actual position feedback signal and any differences therein, after being amplified, are applied so as to reposition the actuator and reduce the error to zero. Thus, each actuator is controlled by an electrical input and a electrical feedback provided by the actuator output position transducer (LVDT). The actuator output may control an aerodynamic control surface or any other device whose position control is to be effected by the electrical inputs to the system.

The outputs of servo amp and drivers 18, 20, 22 and 24 are applied, respectively, to channel signal switches 48, 50, 52 and 54. Each of the signal switches 48, 50, 52, 54 has a channel control signal 56, 58, 60 and 62 respectively. Normally, the channel signal switches are closed such that they pass their respective electrical control inputs, 64, 66, 68 and 70 directly through as outputs 72, 74, 76, 68. However, upon application of an appropriate signal at channel control 56, 58, 60, 62, the channel switch will open with the result that there will be no electrical control signal at switch output 72, 74, 76, 78. Depending upon the logic utilized in the Monitor and Control Logic group, the signal applied to channel control to cause the channel signal switches to open can be either a logic "1" to "0". Additionally, the electrical control input to the channel I and channel IV signal switches 50 and 54, respectively, is also applied to channel II and channel IV transfer switches, 80 and 82, respectively. The transfer switches are normally open but application of a logically appropriate transfer control signal at inputs 84 and 86 respectively, will apply the channel II and channel IV electrical control inputs 66 and 70, respectively, to inputs 88 and 90 of servovalves "B" and "C", respectively.

As is also shown in FIG. 9, the channel II and channel III signal switch outputs 72 and 76 are also inputs to electrohydraulic (EH) servovlaves "B" and "C".

While the servovalves "B" and "C" shown in FIG. 9 have two separate inputs (for additional redundancy) the inputs could be combined to a single input controlling the servovalve. In a preferred embodiment of the two input version shown in FIG. 9, a dual coil torque motor mechanically controls a hydraulic valve which in turn controls the rate of hydraulic actuator movement. The dual coil torque motor has one coil connected to each of the servovalve inputs and is used to integrate the input commands from either channel although both channels are never operational at the same time.

In the embodiment of FIG. 9, the hydraulic valves in servovalves "B" and "C" are mechanically connected to "rate" LVDTs 92 and 94 which provide a rate indicative electrical output at 96 and 98, respectively.

In the preferred embodiment shown in FIG. 9, the output of channel II and channel IV signal switches, 74 and 78, are applied to inputs of servovalve "B" and servovalve "C" models, 100 and 102, respectively. The servovalve models provide an electrical output relative of the output which would be expected from a rate LVDT connected to a servovalve which had an input equal to the input of the model. In other words, given equal inputs to the servovalve B and servovalve B submodel, the rate LVDT "B" output 96 should be substantially the same as servovalve "B" model output 104. Similarly, model output 106 from servovalve "C" model 102 should be substantially similar to the output 98 of rate LVDT "C" if the input to servovalve "C" is the same as the input to servovalve "C" model 102.

One of the advantages of the present system is the simplicity of modeling the rate of servoactuator operation as compared to the complexity of modeling servoactuator position which is significantly more dependent on actuator loads which in many instances are quite variable. The electronic model of the electrohydraulic servovalve operation can comprise a zero order (linear) transfer function which provides an output signal which closely approximates the signal provided by an LVDT mechanically coupled to a valve which has had the same input control signal applied to it. Servovalve modeling and the usefulness of linear transfer functions for approximating servovalve response is well established and is further explained in Moog Technical Bulletin 103 as revised in January 1965 with Appendices I and II, available from Moog Incorporated, Controls Division, East Aurora, N.Y. 14052. Although preferred embodiments of the present invention use a zero order linear transfer function, some applications of the present invention may require the use of first or second order transfer functions to obtain proper approximations of servovalve response to the control input.

Continuing with the embodiment of FIG. 9, the rate indicative outputs 96 and 98 are applied to normally closed channel monitor switches 108 and 110, respectively such that the rate indicative outputs 96 and 98 are applied to comparison terminals $C_2$ and $C_3$, respectively. The monitor switches are suplied with control inputs 112 and 114 which upon application of a logically appropriate signal will cause the monitor switch to open disconnecting their associated comparison terminals from the rate indicative outputs of their respective LVDTs.

Channel transfer 116 and 118 are associated with channels I and IV and normally pass the modeled rate indicative outputs 104 and 106 from the servovalve models to comparison terminals $C_1$ and $C_4$, respectively. However, when logically appropriate transfer control signals 120 and 122 are applied to transfer monitors 116 and 118, comparison terminals $C_1$ and $C_4$ are disconnected from rate indicative outputs 104 and 106 and instead connected to rate indicative outputs 96 and 98, respectively.

The actuator sections 42 and 44 have bypass valves 124 and 126 hydraulically connected thereto. The bypass valves B and C are responsive to bypass control signals applied to bypass valve inputs 128 and 130, respectively. As noted earlier, the bypass valve can be electrically set in a bypass position by a logically appropriate bypass valve input in order to prevent hydraulic locking when the associated hydraulic system has failed or both of its associated electrical channels have failed. As noted earlier, if it is desirable to restrain the actuator in the event of failure of both related electrical channels or the related hydraulic system, the bypass valve input will cause the valve to assume a position which promotes hydraulic locking of the servovalve in position. This latter situation would be useful to retain hydraulic control of a control surface which is differentially connected to two separate actuators as shown in the Bartlett et al patent discussed earlier. In either situation the servoactuator is placed in a passive-fail mode.

Table 1 provides an indication of the switch operation during various channel failure conditions and details the output at comparison terminals $C_1$ through $C_4$. The "bias" is the control signal applied to the channel signal switches, the channel monitor switches, the channel transfer switches and the channel transfer monitor switches. As can be seen, with channels I and II in proper operation, the channel I and channel II signal switches and the channel I monitor switch are normally closed with the channel I transfer switch open. The channel II transfer monitor is in its closed position with respect to comparison terminal $C_1$ and the output of the servovalve "B" model output 104. The channel I transfer monitor switch is open with respect to the output 96 of rate LVDT "B". Therefore, zero or no bias is applied to any of the switches as is indicated in note 2. However, if negative logic were used, these switches could be held closed by a control signal which if interrupted would indicate a failure bias. The choice of positive or negative logic is not critical to the present invention.

It can be seen that if channel II fails, the output at comparison terminal $C_2$ will differ from the output at the other comparison terminal with the result that the Monitor and Control Logic will provide the necessary control signals. With a channel II failure, a control signal is applied to each switch causing the channel II signal switch to open thus preventing it from applying any control inputs to EH servovalve "B". Additionally, the channel II monitor switch 108 will open thus preventing the output 96 of rate LVDT "B" from being applied to comparison terminal $C_2$. The channel I transfer switch normally open, is closed so as to apply channel II servo amp and driver output 66 to the input 88 of EH servovalve "B". Accordingly, the channel I signal switch opens which terminates the application of the switch output to a servovalve "B" model 100. The channel I transfer monitor switch 116 normally connecting comparison terminal $C_1$ to model output 104, instead connects $C_1$ to the rate LVDT "B" output 96. Therefore, where $C_1$ had been a "modeled" rate indicative output prior to channel II failure, it is now the actual rate indicative output from EH servovalve "B" as controlled by channel I.

In the event channel I fails and channel II remains operational, all switches remain exactly in their normal operational condition with the exception of the channel I signal switch whose control input causes the switch to open interrupting the application of control input 66 to the input of servovalve model 100. This prevents any signal from appearing at comparison terminal $C_1$ and thus the remaining "good" terminals continue to be compared without regard to failed channel I and any spurious output appearing at comparison terminal $C_1$.

If both channels have failed, the channel II and channel I signal switches will open preventing the passing on of switch outputs to the servovalve input and the servovalve model input, respectively. Additionally, the channel I transfer switch will remain open preventing an electrical control input 66 from being applied to the input of EH servovalve "B". The channel II monitor switch will open although it is unnecessary since there will be no output 96 from rate LVDT "B" (because no input is supplied to the EH servovalve "B"). Because there is no rate LVDT "B" output and there is no servovalve "B" model output, the state of channel I transfer monitor switch is inconsequential and there will be no output at comparison terminal $C_1$ in any event.

Should EH servovalve "B" fail or should rate LVDT "B" fail, the initial indication will be an error signal at comparison terminal $C_2$ which will be interpreted as a failure of the channel II electrical system. The Monitor and Control Logic will accordingly apply failure bias to all switches and route channel I through the channel I transfer switch to the input of EH servovalve "B". However, although channel II is thought of as a failed channel, the remaining channels I, III and IV will continue to be compared in the Monitor and Control Logic for a deviant signal. Because either EH servovalve "B" or rate LVDT "B" has failed, the output at 96 which is transferred through channel I transfer monitor to comparison terminal $C_1$ is still a deviant signal, the Monitor and Control Logic will then determine that channel I has failed as well and consequently place the switches in the same condition as the channel II and channel I combination failure.

Although not shown in the table, under either circumstance of a channel II and I failure or an EH servovalve "B" or LVDT "B" failure a bypass control signal is also applied to the input 128 of the bypass valve B placing the actuator in its previously determined passive-fail orientation. The operation of channels III and IV and their associated switches are precisely the same as for channels II and I.

Figure 11:
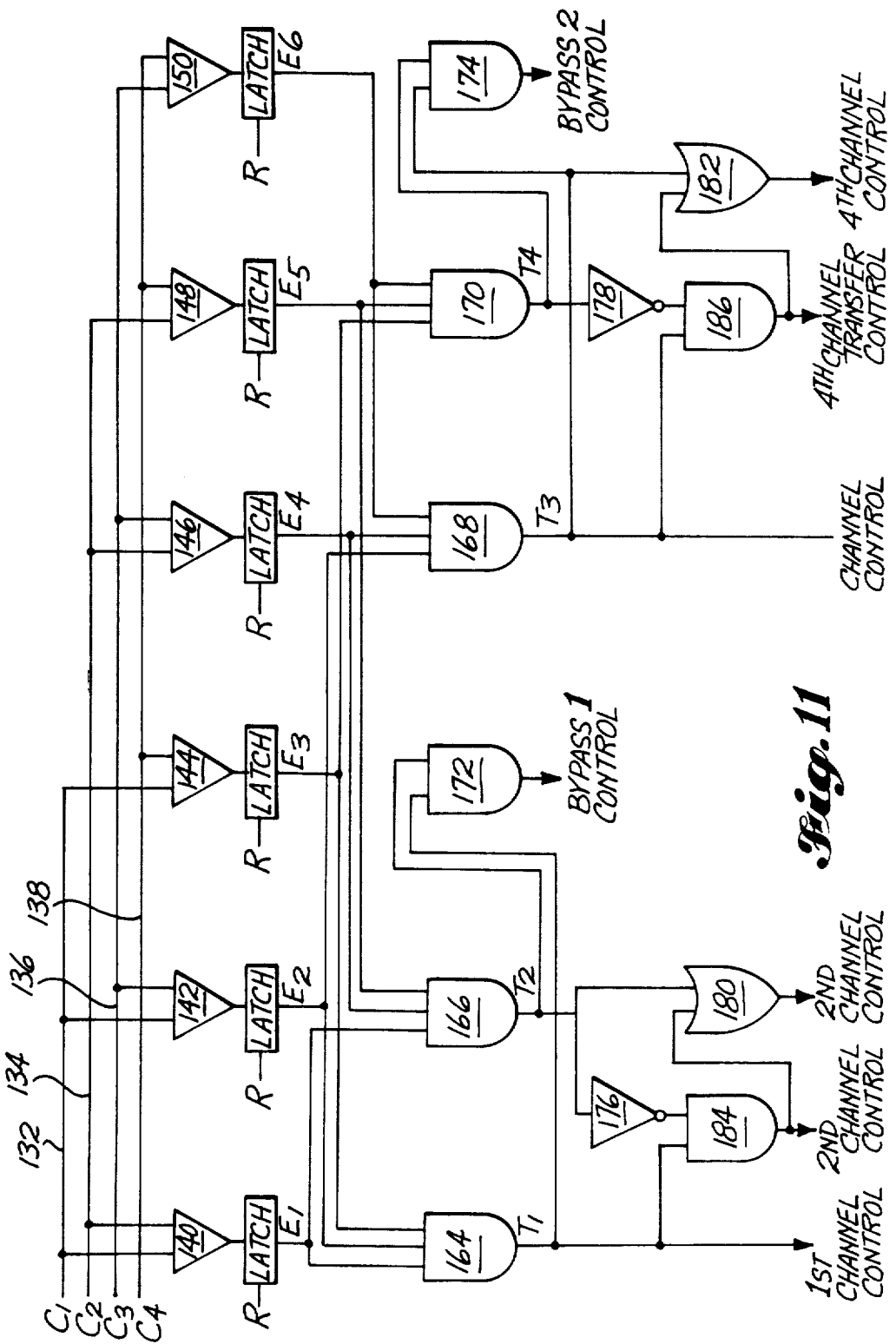
FIG. 11 is a block diagram of the monitor and control logic portion of the control system of FIG. 9.

FIG. 11 illustrates one embodiment of the Monitor and Control Logic which is compatible with FIG. 9. Comparison terminals $C_1$ through $C_4$ are connected to comparison buses 132, 134, 136, 138, respectively, and are selectively connected to comparators 140, 142, 144, 146, 148 and 150. One embodiment of the FIG. 11 Monitor and Control Logic utilizes comparators designated as #LM3302 available from National Semiconductor Corp., 2900 Semiconductor Drive, Santa Clara, CA 95051, utilizing three chips per logic.

The outputs from the various comparators are applied to respective latches, 152, 154, 156, 158, 160 and 162 which each have reset terminals marked "R" and failure signal outputs labeled $E_1$ through $E_6$. In one embodiment these are designated #74279, quad S-R latches and are available from Texas Instrument, 6000 Denton Drive, Dallas, TX. 75222, with two chips per logic utilized.

The failure signal outputs are applied to AND gates 164, 166, 168, 170 as shown in FIG. 11. The outputs of these AND gates have been labeled $T_1$, $T_2$, $T_3$, $T_4$, respectively. The outputs $T_1$ and $T_2$ are connected as two inputs to Bypass AND gate 172. Similarly, $T_3$ and $T_4$ are connected to the inputs of Bypass AND gate 174. The outputs of the Bypass AND gates are connected to the respective inputs of bypass valves B and C. In a preferred embodiment, AND gates 164, 166, 168, 170 may be #74LS11 which are three/three input "AND" gates available from Texas Instrument at the above address with two chips per logic utilized. AND gates 172 and 174 may be #SN7409, which are two/two input "AND" gates also available from Texas Instrument as noted above.

Outputs $T_1$ and $T_3$ can be utilized directly as channels II and III control signals, respectively. Outputs $T_2$ and $T_4$ are fed both to inverters 176 and 178 and to one input of OR gates 180 and 182, respectively. The inverters in a preferred embodiment may be #SN7404, available from Texas Instrument at the above address. The OR gates in a preferred embodiment may be #SN7432, available from Texas Instruments at the above address. The output of the inverters are connected along with outputs $T_1$ and $T_3$ to dual input AND gates 184 and 186, respectively, which AND gates in a preferred embodiment may be #SN74LS15, available from Texas Instruments.

Table 2 is a truth table showing the various logic possibilities, the signals applied to the comparison terminals, the failure signals generated by the comparators, the switching signals at terminals $T_1$ through $T_4$ and the bypass control signals utilized. Reference to this truth table while reviewing the logic for channels I and II will render the operation of the Monitor and Control Logic system obvious to one of ordinary skill in the art.

A failure input on comparison terminal $C_2$ will, through the operation of comparison bus 132, apply the failure signal to comparators 140, 142 and 144. Because there is no failure signal on terminals $C_1$, $C_3$ or $C_4$, the other terminals on comparators 140, 142 and 144 will have a normal indication. Therefore, the difference between the failure input and the normal input will produce failure signal outputs at $E_1$, $E_2$ and $E_3$. Because $E_1$, $E_2$ and $E_3$ are the three inputs to AND gate 164, there will be an output provided at $T_1$ which is the first channel control signal. As noted earlier, this causes both the channel II signal switch 48 and the channel I monitor switch 108 to open.

The output at $T_1$ is also applied to one input of AND gate 184. Because there is no output at $T_2$ (applied to inverter 176) there will be an output provided from inverter 176 to the other input of AND gate 184. Consequently, there will be a second channel transfer control signal applied to the channel I transfer switch 80 causing it to apply the channel I electrical input signal 66 to EH servovalve "B".

Additionally, the output of AND gate 184 is applied to OR gate 180 which also has an input from terminal $T_2$. With either or both inputs having a logical one signal applied thereto, OR gate 180 also provides an output which is the second channel control signal causing channel I signal switch 50 to open. In a preferred embodiment, the channel I transfer control signal is also applied to the channel I transfer monitor 116 causing it to change from providing modeled output 104 at terminal $C_1$ to providing rate LVDT "B" output 96 at comparison terminal $C_1$. Therefore, the logic in FIG. 11 with a failure signal at comparison terminal $C_2$ clearly accomplishes the result disclosed earlier with reference to FIG. 9.

In the event a failure signal is applied to comparison terminal $C_1$, it will simultaneously be applied by means of comparison bus 134 to comparators 140, 146 and 148 where it is compared with the signals on comparison terminals $C_2$, $C_3$, and $C_4$, respectively. The resultant comparator outputs operating through the latches will provide failure signal outputs at $E_1$, $E_4$ and $E_5$. These three outputs are connected as inputs to AND gate 166 and will consequently provide an output at $T_2$. The output at $T_2$ applied to the input of OR gate 180 ensures that there will be a second channel control signal input which is applied in FIG. 9 to the channel I signal switch 50, only. Accordingly, the channel I signal switch is opened and servovalve "B" model output 104 is terminated and thus no further output is provided at comparison terminal $C_1$. There being no output at $T_1$, there will be no first channel control signal nor will there be a second channel transfer control signal and thus the Monitor and Control Logic meets the Table 1 requirements with respect to channel I failure.

If both channels II and I are failed or, as noted before, if either EH servovalve "B" or rate LVDT "B" fails, there will be error signals applied to comparison terminals $C_2$ and $C_1$. This will result in failure signals outputs at $E_1$, $E_2$, $E_3$, $E_4$, and $E_5$. Even though there are failure signals on five of the six outputs of the latches, switching signals will be applied only at terminals $T_1$ and $T_2$. This will of course cause AND gate 172 to provide a bypass control signal placing the actuator in its appropriate inoperative condition. Additionally, the output at $T_1$ ensures that the channel 1 monitor switch 108 will be opened terminating the input to comparison terminal $C_2$ with the signal at $T_2$ being applied through OR gate 180 as the second channel control which opens signal switch 50 and terminates model output 104. Therefore, there will be no output provided at either comparison terminal $C_2$ and $C_1$ in accordance with Table 1.

By continuing the above analysis with reference to channels III and IV, it can be seen that the Monitor and Control Logic also operates properly with respect to a single or double failure of channels III and IV. It should be noted however that if two channels have failed, the failure of a third channel will cause termination of all control function by enabling the previously unactivated bypass valve. Thus, as shown in possibility number 12, Table 2, the fact that one of the four channels is still operational will not effect the failure signal generation or the switching signal generation and will result in bypass signals applied to both bypass valves. Of course, if all four channels have failed, the same situation will occur and both bypass valves will be operated.

Figure 10:
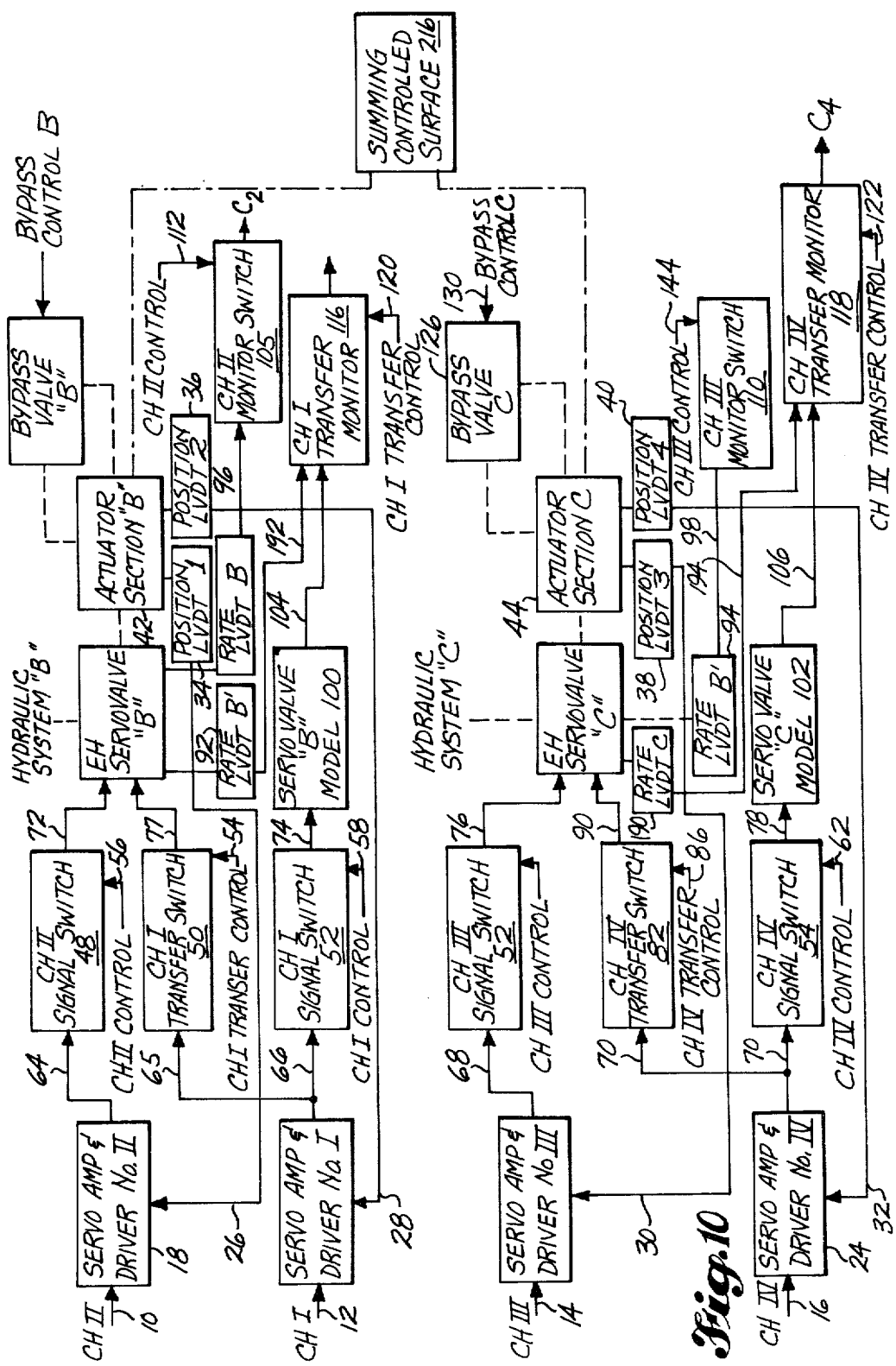
FIG. 10 is a view like FIG. 9, but of a second control system.

FIG. 10 shows a further embodiment of the present invention in which two "rate" LVDTs are connected to each servovalve. FIG. 10 is identical to FIG. 9 with the following noted exceptions. A second rate LVDT "B" and "C" has been mechanically associated with each of servovalves "B" and "C", respectively. These LVDTs are labeled 188 and 190, respectively. Since second LVDT is added, there is no need to supply the output of the original LVDTs, 96 and 98 to inputs of the channel I and IV transfer monitors 116 and 118, respectively. Accordingly, the output of rate LVDTs "C" and "D", 192 and 194, respectively are applied to the input of the channel II and channel IV transfer monitors, respectively.

The operation of the FIG. 10 embodiment may be more clearly understood by reference to Table 3 which shows only the different operations utilized with the FIG. 10 embodiment. For failure modes not shown in Table 3, the failure modes described in Table 1 are accurate. It will be seen that the transfer monitor is normally connected to its associated model channel and provides the modeled rate indicative outputs as signals to the comparison terminals $C_2$ and $C_4$. However, upon failure of either channel I or LVDT "B", the transfer monitor will connect comparison terminal $C_1$ to the actual rate indicative output of servovalve "B" as indicated by rate LVDT "B". The channel IV transfer monitor will similarly connect comparison terminal $C_4$ with actual rate indicative output of servovalve "C" as determined by rate LVDT "C". As pointed out in notes 3 and 4 to Table 3, failure of the additional LVDTs can only occur after the failure of the original LVDTs or the failure of the channel they are normally associated with.

One major advantage of the two/one fail-operational servoactuator system is that if the channel controlling servoactuator (i.e. the active channel) fails, the failed electronic channel will be deactivated and the "model" channel selected so as to replace the failed channel. This corrective process is believed unique among servoactuator systems to date. Additionally, if the failed channel is a "model" channel, it is deactivated and prevented from being selected to replace a failed channel. Contrary to many previous servoactuator systems, two failures associated with a single hydraulic actuator are required to deactivate that actuator. Although the "rate" of servo actuator operation is measured and modeled in the preferred embodiments of this invention, other servoactuator conditions could be measured and modeled.

As have been seen, the rate LVDTs are connected mechanically to the second stage spools of the EH servovalve. In the event of a failure of a channel, the disagreement between the failed channel and the non-failed channels exceeds the premissible threshold after which the comparators provide discrete (digital) error signals. These error signals are latched and thus can be reset only after correction of the failure. This failure logic then has the capability to recognize active, model and dual (active and its associated model) channel failures and trigger the appropriate switching actions.

Although the Monitor and Control Logic is shown using comparators with AND and OR gates, the system could be designed to use Exclusive ORs with AND and OR gates for positive logic; or use Exclusive NORs with NAND and NOR gates for negative logic. For latching error signals, flip-flops may be used as are utilized in the present embodiment. A different method which may be used to mechanize the Monitor and Control Logic is the use of a Read-Only-Memory (ROM). The servo amp and driver, servoloop feedback, failure detection, correction logic and signal switching can be combined through large scale integration (LSI) into one electronic unit which is either attached to the actuator or located close to it. Another method of providing the appropriate apparatus would be to make use of a centralized computer to perform all or a portion of the electronic functions of the actuation system.

Regarding failures in the system, one or more failures can occur at any one time and, according to its nature, can be identified as electrical, hydraulic or mechanical. If the failure happens upstream of the electrohydraulic servovalve it will be recognized as an electrical failure. Any failure of the electrohydraulic valve or loss of hydraulic system pressure would be a hydraulic failure. Mechanism jams and openings will be considered mechanical failures.

It has been seen earlier, after any single detected and corrected electrical failure (not including failure of a rate LVDT) the redundancy level of the actuation system is automatically reconfigured to continue operation as a one fail-operational system. After two independent electrical failures (regardless of whether they are associated with the same servoactuator or not) the actuation system is still operational either with two active channels or with one active and one model channel with the redundancy level of the system reduced to a "fail-safe" level. After the second electrical failure, the actuation system is left with only two operating electrical channels and the comparison logic cannot vote out a third failed channel since it cannot distinguish between a failed and good channel. However, if the difference between the good operating channels exceeds its permissible threshold, the Monitor and Control Logic will shut off all electrical systems and place both actuators in the either "bypass" or "blocked" mode as determined by actuator application.

Regarding hydraulic failures, the actuation system is configured to be operational after a single hydraulic failure but the operation is completely lost after a second hydraulic failure since only two hydraulic channels and two electrohydraulic servovalves are utilized in the system. Hydraulic failures can be characterized as a passive failure (one resulting from a loss of hydraulic system pressure) or a passive/active failure resulting from failure in the electrohydraulic servovalve and, depending on its failure mode (open or shut), can be a hardover or passive output indication.

The effect of a failure in the Monitor and Control Logic can vary in accordance with the failed element or elements of the logic. The failure of one comparator is not sufficient to trigger any control logic for ordering switching or switching and bypass commands. However, it may disable the detection of actuator failure therefor periodic monitoring and verification of the capabilities of the Monitor and Control Logic is appropriate. Since the failure correction logic is digital, it can easily be tested for proper operation. The failure of AND gate 164 or AND gate 168 may switch off operation Channel II or III, respectively, resulting in a single electrical channel failure. The control of the electrohydraulic servovalve will be transferred to its accompanying model channel I or IV, respectively.

The failure of AND gate 166 or AND gate 170 will result in switching off its respective model channel. If this occurs simultaneously with a failure of AND gate 164 or AND gate 168, the logic will put the associated bypass valve into the bypass position resulting in loss of operation of one hydraulic actuator. The failure of a signal switch, transfer switch, monitor switch or transfer monitor switch may cause interferences in signals between active and model channels resulting in shut down of the affected channel. Any element failure in the Monitor and Control Logic may result in no loss of channel operation but in the worst case, loss of only one active and its associated model channel which only eliminates one of the dual actuators. In any event, the system remains operational on the other active and model channels. It should be mentioned that the probability of logic failure is extremely small since periodic verification of the Monitor and Control Logic circuits would normally be accomplished.

Regarding fault tolerance, the FIG. 9 system is capable of operating after the following failures: (a) one (1) single electrical channel or component failure; (b) two (2) independent electrical channel or component failures, not including the two rate LVDTs; (c) one (1) single hydraulic failure, either due to loss of operation of an electrohydraulic servovalve or hydraulic system pressure; (d) one (1) electrical channel and related electrohydraulic servovalve or hydraulic system (e.g., failure of electrical channel II and EH valve "B" or hydraulic system "B"); or (e) any element of the actuation control logic. This last failure may or may not cause loss in channel operation, but in the worst case, it can shut down the operation of only one active and its associated model channel.

The actuation system in FIG. 9 is not capable of operating without additional logic after undergoing one electrical and a non-related hydraulic failure (e.g., failure of channel II and electrohydraulic servovalve "C" or hydraulic system "C").

In the embodiment described in FIG. 10 which has dual rate RVDTs associated with each servovalve, the servovalve rate indicative outputs are still compared with model outputs but if found to differ more than a predetermined amount which indicative of failure of that rate indicatvie output, the differing channel is disconnected from and the associated channel is disconnected from the associated channel is connected to the servovalve with the result that a rate indicative output is provided by the backup LVDT which is associated with the "good" channel. Of course, if a model channel fails, the primary rate LVDT remains in operation.

The fault tolerance of the two/one fail-operation servoactuator system in FIG. 10 has the same fail operational capability as that in FIG. 9 but additionally, the failure of any single monitoring LVDT or any single electrical power supply thereto will not represent a dual failure but only a single channel failure with a corresponding improvement in operational redundancy.

Figure 2:
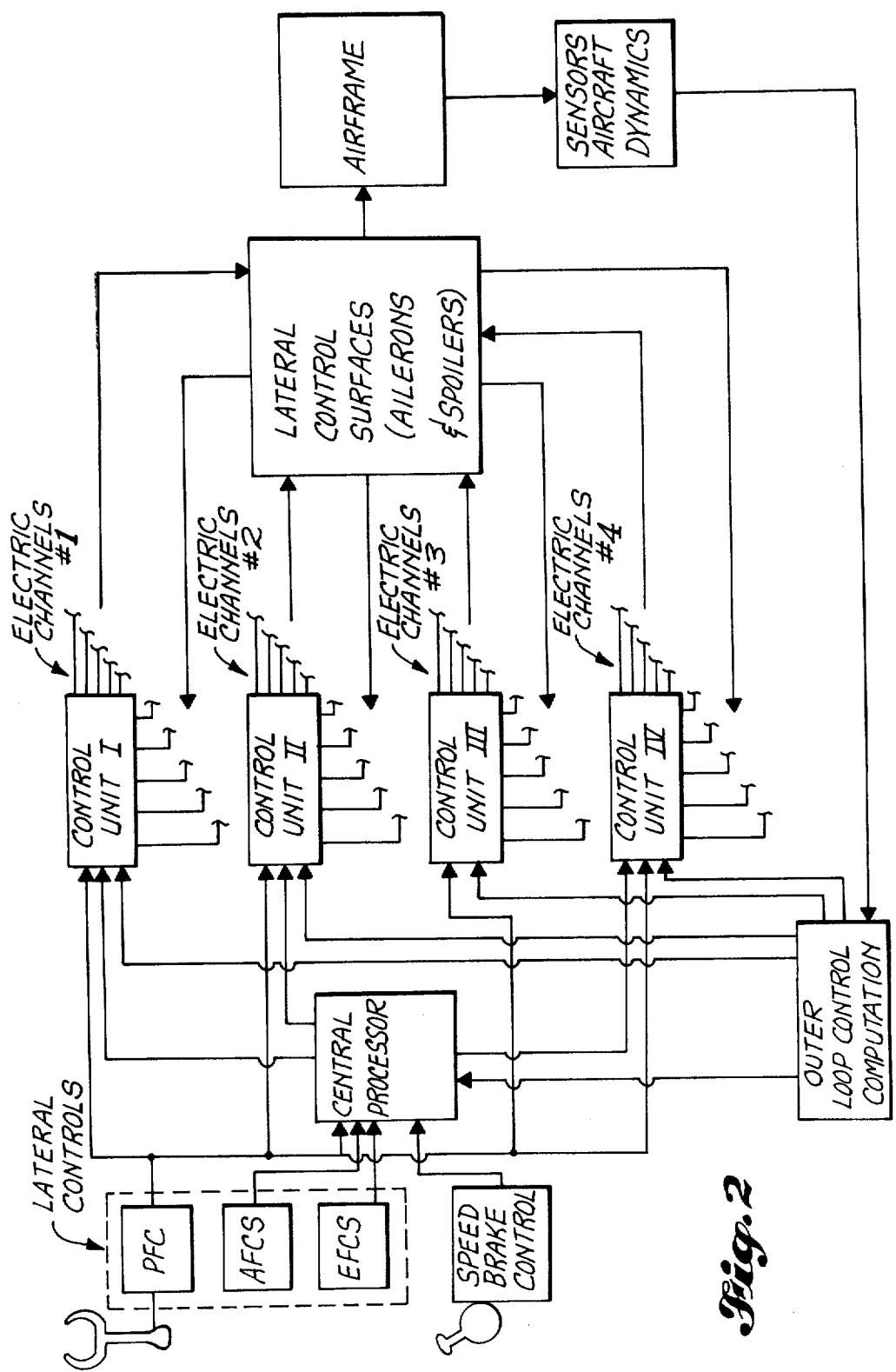
FIG. 2 is a block diagram of the fly-by-wire lateral control system of the present invention minus the hydraulic pressure supply lines.

Referring now to FIG. 2, the ailerons and spoilers are controlled by the pilot through movement of, or a force input to, the control wheels and/or a speedbrake controller. The motion (or force) of these controllers is converted into electrical signals by Linear Variable Differential Transformers (LVDT's) or force sensors, which are mechanically integrated with the wheel and the speedbrake controllers.

The electrical signals created accordingly, via the primary flight control (PFC) system, are transmitted to the control units. The four (4) independent control units provide for specific functions, including: signal processing, computation, servo loop closure, failure detection and correction, and interfacing to the Automatic Flight Control System (AFCS). Two AFCS functions to provide automatic control of specific control operations independent of, or in concert with, two PFC operations. The single or redundant surface actuators each receive control signals from its respective control unit as defined in FIG. 3. The actuation system, as defined herein, receives analog signals independent of the computation technique used in the control units, which could be either analog or digital. This is not a limitation, but only for functional description purposes.

The different lateral control surfaces are controlled by actuation systems with different redundancy levels to optimize the fail-operational capabilities and functional reliabilities with minimum weight and cost. The roll control power of the spoilers and the outboard and inboard ailerons was a serious consideration in establishing the actuation redundancy and distribution of channels. The particular redundancy and/or distribution of channels could vary dependent on the specific aircraft configuration.

As earlier described, each of the six spoiler surfaces per wing is operated by one single thread electrohydraulic servoactuator. The distribution of electrical and hydraulic channels are symmetrical, such that any single channel failure would result in loss of symmetrical surfaces.

The aileron surfaces are divided as outboard and inboard ailerons. The outboard ailerons are locked out at high speed, flaps up, while the inboard ailerons which are essential to aircraft safe operation, are operated throughout the full flight envelope.

Therefore, a one/one fail-operational actuator was established for the outboard ailerons and a two/one fail-operational actuator for the inboard ailerons. The distribution of channels are configured to utilize surface redundancies after actuator redundancies are exhausted.

Each redundant outboard aileron actuator is operated by two active electrical command channels and two hydraulic pressure supplies and monitored by one model electrical channel. This type of actuation system is operational after one electrical or one hydraulic failure.

Each redundant inboard aileron actuator is operated by two active electrical command channels, two hydraulic pressure supplies and two model electrical channels. In the event of an active channel failure, its model channel is activated. This two/one fail-operational actuator is capable of operating after either two independent electrical channel or one hydraulic failure. The distribution of hydraulic supplies to inboard ailerons is such that at least one inboard aileron actuator, either the left or right, is still operational after two hydraulic failures.

The outputs of the active channels of the inboard and outboard aileron actuators are monitored by LVDT's at the second stage of the electrohydraulic servovalves. The outputs of active and model channels are compared with each other and the failure of a channel is determined by the actuator failure detection and correction logic.

The outputs of active channels are mechanically force summed.

In the normal operational mode, all surfaces of the lateral controls are fully operational when all electrical channels, and hydraulic supplies are fully operational.

One or more failures may occur in the lateral control system. These can be either a component or an electrical channel or a hydraulic failure.

Any component failure upstream of the actuators, such as sensors used for signal generation and/or control units will result in an electrical channel failure if the system architecture is based on the "brickwall" method for redundancy management. "Brickwalling" is where no interchannel communication exists upstream of actuators for fault detection. The brickwall system does not use either a Signal Select-Failure Detect (SS/FD) device to manage sensor failures of the flight deck controls or intercommunication between control units to correct for computer failures. The brickwall method employs the redundant actuators of the control system for failure correction. This method is not a limitation, but only for description purposes.

Any failure downstream of the control units—which can be electrical/electronic, hydraulic, or mechanical—represents only one actuator failure. The failure of an aileron actuator will be corrected at the actuator level. The failure of a spoiler actuator will result in loss of operation of the affected spoiler, since spoiler actuators are not redundant (single thread).

A channel failure in the lateral control system represents more deterioration than a component failure because the lateral control effectiveness is the summation of the roll control moments of multisurfaces, that is, ailerons and spoilers.

The following discussion presents the fail operational performance on a channel basis, such as after an electrical channel and/or hydraulic line failure(s).

After any single, failure, either electric channel or hydraulic line, the inboard and outboard aileron actuators and hence all aileron surfaces remain operational. All aileron surfaces are operated by at least one fail-operational actuator. Status of channels are analyzed for inboard ailerons on Table 1.

Spoiler control is different than the aileron control. The spoiler surfaces are operated by single thread electrohydraulic servoactuators, and therefore any electrical command channel failure, or hydraulic failures, will result in a loss of operation of one or two pair of symmetrical spoilers depending on the failed channel or supplies.

In the event of failure of channel I and/or hydraulic system "A", the operation of two symmetrical spoiler surfaces, S1 and S14, are lost. Channel II and/or hydraulic system "B" has a similar affect on the lateral controls as operation of two symmetrical spoiler surfaces, S2 and S13 are lost.

The loss of channels III and IV and/or hydraulic "C" and "D" affects two spoiler surfaces per wing. The operation of two symmetrical outboard spoilers, S3 and S12 and two symmetrical inboard spoilers, S6 and S9 are lost as either channel III and/or hydraulic "C" fail. Similarly, four symmetrical outboard spoilers, S4, S5, S10 and S11 can be lost in the event of channel IV and/or hydraulic "D" failure.

In conclusion, the roll control power of the lateral control system is slightly degraded with a single electrical channel failure, or a single hydraulic failure, because the operation of one or two symmetrical spoiler surfaces are lost depending on which electrical channel or hydraulic system fails. This degradation is small since all the ailerons and a minimum of four symmetrical spoiler surfaces are still operational.

The roll control power with a second electrical channel or hydraulic failure further decreases as operation of more surfaces are lost.

After a second electrical channel or hydraulic failure, the control of the operational outboard aileron surfaces may or may not be reduced depending on which channels or hydraulics are affected.

If electric channels I and II are failed, the operation of both outboard ailerons are lost, because they are common for both actuators. For failure of channels III and IV, the operation of both outboard aileron actuators will continue since each outboard aileron actuator loses only one channel. For any other combination of failed channels, one outboard aileron remains operational. In the event of a second hydraulic failure, one or both outboard aileron actuators remain operational depending on the failed hydraulic systems.

The status of electrical channels and hydraulic systems for the inboard ailerons are analyzed after first and second electrical channel failures in Table 4. This table clearly indicates, that both inboard aileron actuators are operational on different active channels to the left and right after a second electrical channel failure.

The same conclusions can be drawn in regard to hydraulic system failures, that is, after two hydraulic failures, both or at least one inboard aileron actuator is still operational depending on the hydraulic failure.

The loss of two electrical channels or two hydraulic systems reduces the roll control power of the spoilers to approximately half, depending on the failed channels or systems. It is assumed that the failed spoiler actuators fail passively, i.e., no roll control moments are required to negate the roll control moments of the failed spoilers.

In conclusion, any two electrical channel or hydraulic failures will reduce the roll control power of the lateral controls in accordance to channel/hydraulic failures, but the remaining operational surfaces will provide more than the minimum safe control. The control surface configuration shown by FIG. 1 has a roll control power of 57-75% after a dual electrical failure and 50-74% after a dual hydraulic failure. Minimum safe lateral control was established to be 27% of total roll control power. Hence, considerable margin exists for a safe operating lateral control system following double failures, for the reference airplane configuration.

Any lateral control system, using four electrical channels in combination with comparison logic for failure detection and correction, can usually take two failures and possess at least minimum safe operational capability. The system cannot facilitate a third failure for obvious reasons, i.e. there is inadequate logic for fault detection using comparison and voting logic when only two channels remain operational. The inboard aileron actuators are electrically two-fail-operation actuators and the comparison and voting logic by its nature needs a minimum of three channels to detect failures. As all inboard ailerons are lost, the roll control power of the lateral control system is reduced to less than the minimum safe control.

To achieve a three-fail-operational (electrical) capability for the lateral control system, the failure detection logic for inboard actuators has to be changed from comparison and voting logic to self-mounting logic after the second electrical failure.

The final conclusion is that it is possible to achieve an electrically three-fail-operational capability for lateral controls with only four independent electrical channels and with a two-fail-operational inboard aileron actuators by usage of correct combinations of actuation and surface redundancy and the proper failure detection and correction logic.

This paragraph and Table 4 explain the method and logic for achieving a three-fail-operational capability. Table 4 shows all possibilities of two channel failures for inboard aileron actuators and the remaining operational channels after two independent failures. This tabulation clearly indicates that at least two different operational active channels are connected to the left and to the right inboard aileron actuators. Therefore, any third channel failure—if it can be recognized and shut off—leaves the lateral controls with one operational inboard aileron actuator.

The failure detection and correction logic for the inboard aileron actuators is as follows:

Upon a first failure:
  (a) Active Channel failed; switched off and its model channel activated.
  (b) Model Channel failed; switch off.
  (c) After "First Failure"; two active and one model channel remains (one fail-op system)

Upon a second failure:
  (a) Active Channel failed; the failed active channel is switched off.
  (b) Model Channel failed; the failed model channel is switched off.

After a second failure:
  (a) The left and right inboard aileron actuators are operated either by two active channels, or by two active and one active/model or by different active and model channels to left and right.
  (b) Comparison logic is switched to self-monitoring logic for failure detection as the independent channels are reduced to two.

In the event of a third electrical channel failure, the self-monitoring failure detection and correction logic switches off the third failed channel and the inboard aileron actuation system is left with one operational inboard aileron actuator. After three (3) channel failures, one inboard aileron surface remains operational. This operational aileron actuator—with at least two symmetric spoilers operating—provides at least minimum safe roll control power.

In other installations, it might be desirable to use a two/one fail operational electrohydraulic servoactuator for positioning the outboard ailerons. In such a system, the outboard ailerons might be used to compensate for wind gusts, for example.

TABLE 1

| FAILURE MODES | CHANNEL OPERATION CH. II | CHANNEL OPERATION CH. I | CH II SIGNAL | CH II MONITOR | CH I TRANSFER | CH I SIGNAL | CH I TRANSFER MONITOR | SIGNALS TO COMPARISON TERMINALS $C_2$ | SIGNALS TO COMPARISON TERMINALS $C_1$ |
|---|---|---|---|---|---|---|---|---|---|
| NO FAILURE | 0 | 0 | CLOSED | CLOSED | OPEN | CLOSED | TO CH. | YES | YES |
| BIAS | | | 0 | 0 | 0 | 0 | 0 | | |
| CH. II FAILED CH. I GOOD | 1 | 0 | OPEN | OPEN | CLOSED | OPEN | TO LVDT " " | NO | YES |
| BIAS | | | 1 | 1 | 1 | 1 | 1 | | |
| CH. I FAILED CH. II GOOD | 0 | 1 | CLOSED | CLOSED | OPEN | OPEN | TO CH. I | YES | NO |
| BIAS | | | 0 | 0 | 0 | 1 | 0 | | |
| CH. II & I FAILED | 1 | 1 | OPEN | OPEN | OPEN | OPEN | DON'T CARE | NO | NO |
| BIAS | | | 1 | 1 | 0 | 1 | 0 | | |
| $E_H$ VALVE "B" OR LVDT B FAILED | 1 | 1 | OPEN | OPEN | OPEN | OPEN | DON'T CARE | NO | NO |
| BIAS | | | 1 | 1 | 0 | 1 | 0 | | |
| FAILURE MODES | CH. III | CH. IV | CH III SIGNAL | CH III MONITOR | CH IV TRANSFER | CH IV SIGNAL | CH IV TRANSFER MONITOR | $C_3$ | $C_4$ |
| NO FAILURE | 0 | 0 | CLOSED | CLOSED | OPEN | CLOSED | TO CH. IV | YES | YES |
| BIAS | | | 0 | 0 | 0 | 0 | 0 | | |
| CH. III FAILED CH. IV GOOD | 1 | 0 | OPEN | OPEN | CLOSED | OPEN | TO LVDT "C" | YES | NO |

TABLE 1-continued

| | | | | | | | | |
|---|---|---|---|---|---|---|---|---|
| BIAS | | | 1 | 1 | 1 | 1 | 1 | |
| CH. IV FAILED | | | | | | | | |
| CH. III GOOD | 0 | 1 | CLOSED | CLOSED | OPEN | OPEN | TO CH. IV | YES NO |
| BIAS | | | 0 | 0 | 0 | 1 | 0 | |
| CH. III & IV FAILED | 1 | 1 | OPEN | OPEN | OPEN | OPEN | DON'T CARE | NO NO |
| BIAS | | | 1 | 1 | 0 | 1 | 0 | |
| $E_H$ VALVE "C" | 1 | 1 | OPEN | OPEN | OPEN | OPEN | DON'T CARE | NO NO |
| OR LVDT C FAILED | | | | | | | | |
| BIAS | | | 1 | 1 | 0 | 1 | 0 | |

NOTE 1:
0 — GOOD
1 — FAILED

NOTE 2:
0 — NO BIAS
1 — FAILURE BIAS

TABLE 2

| | SIGNALS FOR LVDT'S TO COMPARATORS | | | | FAILURE SIGNALS FROM COMPARATORS | | | | | | SWITCHING SIGNALS TO SWITCHES | | | | BYPASS CONTROL | | FAILURE OF |
|---|---|---|---|---|---|---|---|---|---|---|---|---|---|---|---|---|---|
| | | | | | | | | | | | | | | | ACT. | ACT. | |
| Possibilities | $C_2$ | $C_1$ | $C_3$ | $C_4$ | $E_1$ | $E_2$ | $E_3$ | $E_4$ | $E_5$ | $E_6$ | $T_1$ | $T_2$ | $T_3$ | $T_4$ | NO. 1 | NO. 2 | CHANNELS |
| 1 | 0 | 0 | 0 | 0 | 0 | 0 | 0 | 0 | 0 | 0 | 0 | 0 | 0 | 0 | 0 | 0 | 0 |
| 2 | 1 | 0 | 0 | 0 | 1 | 1 | 1 | 0 | 0 | 0 | 1 | 0 | 0 | 0 | 0 | 0 | 1 |
| 3 | 0 | 1 | 0 | 0 | 1 | 0 | 0 | 1 | 1 | 0 | 0 | 1 | 0 | 0 | 0 | 0 | |
| 4 | 0 | 0 | 1 | 0 | 0 | 1 | 0 | 1 | 0 | 1 | 0 | 0 | 1 | 0 | 0 | 0 | |
| 5 | 0 | 0 | 0 | 1 | 0 | 0 | 1 | 0 | 1 | 1 | 0 | 0 | 0 | 1 | 0 | 0 | |
| 6 | 1 | 1 | 0 | 0 | 1 | 1 | 1 | 1 | 1 | 0 | 1 | 1 | 0 | 0 | 1 | 0 | 2 |
| 7 | 1 | 0 | 1 | 0 | 1 | 1 | 1 | 1 | 0 | 1 | 1 | 0 | 1 | 0 | 0 | 0 | |
| 8 | 1 | 0 | 0 | 1 | 1 | 1 | 1 | 0 | 1 | 1 | 1 | 0 | 0 | 1 | 0 | 0 | |
| 9 | 0 | 1 | 1 | 0 | 1 | 1 | 0 | 1 | 1 | 1 | 0 | 1 | 1 | 0 | 0 | 0 | |
| 10 | 0 | 1 | 0 | 1 | 1 | 0 | 1 | 1 | 1 | 1 | 0 | 1 | 0 | 1 | 0 | 0 | |
| 11 | 0 | 0 | 1 | 1 | 0 | 1 | 1 | 1 | 1 | 1 | 0 | 0 | 1 | 1 | 0 | 1 | |
| 12 | 1 | 1 | 1 | 0 | 1 | 1 | 1 | 1 | 1 | 1 | 1 | 1 | 1 | 0 | 1 | 1 | 3 |
| 13 | 1 | 1 | 1 | 1 | 1 | 1 | 1 | 1 | 1 | 1 | 1 | 1 | 1 | 1 | 1 | 1 | 4 |

1 — Failed
0 — Good

0 — No Error Signals
1 — Error Signals

0 — No Switching Signals
1 — Switching

TABLE 3

| | CHANNEL OPERATION | | SWITCHES | | | | | SIGNALS TO COMPARISON TERMINALS | |
|---|---|---|---|---|---|---|---|---|---|
| FAILURE MODES | CH. II | CH. I | CH II SIGNAL | CH II MONITOR | CH I TRANSFER | CH I SIGNAL | CH I TRANSFER MONITOR | $C_2$ | $C_1$ |
| CH. II FAILED | | | | | | | | | |
| CH. I GOOD | 1 | 0 | OPEN | OPEN | CLOSED | OPEN | TO LVDT "B'" | NO | YES |
| BIAS | | | 1 | 1 | 1 | 1 | 1 | | |
| LVDT "B" FAILED | 1 | 1 | OPEN | OPEN | CLOSED | OPEN | TO LVDT "B'" | NO | YES |
| BIAS | | | 1 | 1 | 1 | 1 | 1 | | |
| LVDT "B'" FAILED (NOTE 3) | 1 | 1 | OPEN | OPEN | OPEN | OPEN | DON'T CARE | NO | NO |
| BIAS | | | 1 | 1 | 0 | 1 | 0 | | |

| | CHANNEL OPERATION | | SWITCHES | | | | | SIGNALS COMPARISON TERMINALS | |
|---|---|---|---|---|---|---|---|---|---|
| FAILURE MODES | CH. III | CH. IV | CH III SIGNAL | CH III MONITOR | CH IV TRANSFER | CH IV SIGNAL | CH IV TRANSFER MONITOR | $C_3$ | $C_4$ |
| CH. III FAILED | | | | | | | | | |
| CH. IV GOOD | 1 | 0 | OPEN | OPEN | CLOSED | OPEN | TO LVDT "C'" | NO | YES |
| BIAS | | | 1 | 1 | 1 | 1 | 1 | | |
| LVDT C FAILED | 1 | 1 | OPEN | OPEN | CLOSED | OPEN | TO LVDT "C'" | NO | YES |
| BIAS | | | 1 | 1 | 1 | 1 | 1 | | |
| LVDT C' FAILED (NOTE 4) | 1 | 1 | OPEN | OPEN | OPEN | OPEN | DON'T CARE | NO | NO |
| BIAS | | | 1 | 1 | 0 | 1 | 0 | | |

NOTE 1:
0 — GOOD
1 — FAILED

NOTE 2:
0 — NO BIAS
1 — FAILURE BIAS

NOTE 3:
FAILURE OF LVDT B' ONLY OCCURS AFTER THE FAILURE OF CHANNEL II OR LVDT B
NOTE 4:
FAILURE OF LVDT C' ONLY OCCURS AFTER THE FAILURE OF CHANNEL III OR LVDT C

TABLE 4

| FAILED CHANNELS | STATUS OF CHANNELS AFTER ONE AND TWO FAILURES INBOARD AILERONS | | | | | | | | POSSIBILITIES AFTER FAILURES |
|---|---|---|---|---|---|---|---|---|---|
| | OPERATIONAL STATUS OF CHANNELS | | | | | | | | |
| | LEFT INBD AILERON | | | | RIGHT INBD AILERON | | | | |
| | CH. I | CH. II | CH. III | CH. IV | CH. I | CH. II | CH. III | CH. IV | |
| O | M | A | A | M | A | M | M | A | NO FAILURE |
| I | — | A | A | M | — | M | M | A | CASE 1 |
| I & II | — | — | A | M | — | — | M | A | FAILED CHANNELS I & II |
| I | — | A | A | M | — | A | M | A | CASE 2 |
| I & III | — | A | — | M | — | A | — | A | FAILED CHANNELS I & III |
| I | — | A | A | M | — | A | M | A | CASE 3 |
| I & IV | — | A | A | — | — | A | M | — | FAILED CHANNELS I & IV |
| II | A | — | A | M | A | — | M | A | CASE 4 |
| II & III | A | — | — | M | A | — | — | A | FAILED CHANNELS II & III |
| II | A | — | A | M | A | — | M | A | CASE 5 |
| II & IV | A | — | A | — | A | — | A | — | FAILED CHANNELS II & IV |
| III | M | A | — | A | A | M | — | A | CASE 6 |
| III & IV | M | A | — | — | A | M | — | — | FAILED CHANNELS III & IV |

NOTE:
A — OPERATIONAL ACTIVE CHANNEL
M — OPERATIONAL MODEL CHANNEL

We claim:

1. In an aircraft, a fly-by-wire type lateral control system, comprising:
   a first set of lateral control surfaces comprising a plurality of control surfaces;
   a separate first-set electrohydraulic actuator drivingly connected to each lateral control surface of said first set;
   a second set of lateral control surfaces comprising a plurality of control surfaces;
   a separate second-set one/one fail-operational electrohydraulic actuator drivingly connected to each lateral control surface of said second set, each said actuator having two hydraulic sections for redundant operation;
   a third set of lateral control surfaces comprising a plurality of control surfaces;
   a separate third-set two/one fail-operational, electrohydraulic actuator drivingly connected to each lateral control surface of said third set, each said actuator having two hydraulic sections for redundant operation;
   four separate hydraulic pressure supplies;
   four separate electric control signal command channels;
   control means for said system comprising:
   first means associating each first-set actuator with a single one of said channels and a single one of said hydraulic pressure supplies;
   second means associating each second-set actuator with three of said channels and associating each redundant hydraulic section of each second-set actuator with a single hydraulic pressure supply;
   third means associating each third-set actuator with all four of said channels and associating each redundant hydraulic section of each third-set actuator with a single hydraulic pressure supply; and
   failure responsive means for causing the lateral control system to continue to be operable after three electric channel failures, or three hydraulic pressure supply failures, or a combination of three electrical channel and three hydraulic pressure supply failures.

2. A control system according to claim 1, wherein the first set of lateral control surfaces are spoilers and comprise a symmetrical pattern of a like number of spoilers on each wing of the aircraft, and wherein the said hydraulic pressure supplies and said electric control signal command channels to said actuators are also symmetrical, such that any single electrical channel or hydraulic failure would result in the loss of symmetrical surfaces.

3. A control system according to claim 2, comprising at least four spoilers on each wing, each of which is associated with a separate one of the four electric control signal command channels and a separate one of the four hydraulic pressure supplies.

4. A control system according to claim 3, wherein the first set of lateral control surfaces comprises a group of at least four outboard spoilers and at least one inboard spoiler on each wing.

5. A control system according to claim 4, wherein the outboard spoilers comprise at least a group of four spoilers, each of which is associated with a different one of the four electric control signal command channels and a different one of each of said hydraulic pressure supplies.

6. A control system according to claim 5, comprising a fifth outboard spoiler positioned immediately inwardly of the group of four spoilers, said fifth outboard spoiler being associated with the same electric control signal command channel and the same hydraulic pressure supply as the outboard spoiler closest to it.

7. A control system according to claim 6, wherein the inboard spoiler is associated with the same electric control signal command channel and the same hydraulic pressure supply as the third outboard spoiler counting inwardly.

8. A control system according to claim 1, wherein the second set of lateral control surfaces comprises a symmetrical arrangement of outboard ailerons, one on each wing, wherein one said outboard aileron is associated with two of the four hydraulic pressure supplies and the other is associated with the remaining two of the hydraulic pressure supplies.

9. A control system according to claim 1, wherein two of the four separate electric control signal command channels are associated with one of the outboard ailerons, as active channels and the remaining two of said four separate electric control signal command channels are associated with the other outboard aileron, as active channels.

10. A control system according to claim 9, wherein the third channel associated with each outboard aileron is a model channel.

11. In an aircraft, a fly-by-wire lateral control system, comprising:
- a symmetrical pair of lateral control surfaces, one on each wing of an aircraft;
- a plurality of two/one fail-operational, electrohydraulic actuators, each of which is drivingly connected to a separate lateral control surface, each said actuator comprising two hydraulic sections for redundant operation;
- four separate hydraulic pressure supplies;
- four separate electric control signal command channels;
- each said actuator including control means controlling each of its said two hydraulic sections with a dedicated separate hydraulic pressure supply, so that each of said four hydraulic pressure supplies is connected to a separate one of the four hydraulic sections, said control means also controlling all four of said electric-control signal command channels associated with each actuator, with two of said channels serving as active channels for a first of said actuators and as model channels for the second actuators, and with the remaining two channels serving as model channels for the first actuator and as active channels for the second actuator; and
- said control means for each actuator comprising:
- first means, associated with the two active channels for each actuator, and responsive to an electrical input signal supplied thereto, for independently and actively controlling the rate of operation of said two hydraulic sections of such actuator and for providing two rate indicative outputs, one for each hydraulic section;
- second means, associated with said two model channels for such actuator, and responsive to said electrical input signal supplied thereto, for modeling said first means and for providing two modeled rate indicative outputs, each modeled rate indicative output similar to the rate indicative output generated by said first means if said electrical input signal is applied to said first means through one of said two active channels; and
- third means for comparing the four rate indicative outputs generated from the first and second means and for providing a first failure signal if one of said four rate indicative outputs differs from the other three rate indicative outputs by a predetermined amount.

12. A control system according to claim 11, including first disabling means, responsive to said first failure signal, for disabling said channel associated with said one of said rate indicative outputs.

13. A control system according to claim 12, including four means for comparing the remaining three rate indicative outputs when said one rate indicative output is disabled, and for providing a second failure signal if one of said remaining three rate indicative outputs differs from the other two of said remaining three rate indicative outputs by a predetermined amount.

14. A control system according to claim 13, including second disabling means, responsive to said second failure signal, for disabling said channel associated with said one of said remaining three rate indicative outputs.

15. A control system according to claim 14, further including fifth means for comparing the remaining two rate indicative outputs when two of said rate indicative outputs are disabled and for providing a third failure signal if one of said remaining two rate indicative outputs differs by a predetermined amount; and
third disabling means, responsive to said third failure signal, for disabling all four signal command channels.

16. A control system according to claim 15, including means responsive to said third failure signal, for placing both hydraulic sections of said actuator in a passive-fail mode.

17. A control system according to claim 13, wherein one model channel and one active channel are associated with each hydraulic section of the actuator, said system including means, responsive to signals indicative of failure of both model and active channels associated with one actuator hydraulic section, for placing said one actuator hydraulic section in a passive-fail mode.

18. In an aircraft, a fly-by-wire lateral control system, comprising:
- a symmetrical pair of lateral control surfaces, one on each wing of an aircraft;
- a plurality of two/one fail-operational, electrohydraulic actuators, each of which is drivingly connected to a separate lateral control surface, each said actuator comprising two hydraulic sections for redundant operation;
- four separate hydraulic pressure supplies;
- four separate electric control signal command channels;
- each actuator including control means for controlling each of its said two hydraulic sections with a separate hydraulic pressure supply, so that each said hydraulic pressure supply is dedicated to a single hydraulic section, said control means also controlling all four of said electric control signal command channels associated with each actuator, with two of said channels serving as active channels for a first of said actuators and as model channels for the second actuator, and with the remaining two channels serving as model channels for the first actuator and active channels for the second actuator; and
- each said control means comprising:
- first means, associated with the active signal command channel for each actuator hydraulic section, and responsive to an electrical input signal supplied thereto, for actively controlling the rate of operation of its actuator hydraulic section, and for providing an actual actuator condition output;
- second means, associated with model channel for each actuator hydraulic section, and responsive to said electrical input signal supplied thereto, for modeling said first means and for providing a modeled actuator condition output, said modeled actuator condition output similar to the actuator condition output generated by said first means when said electrical input signal is applied to said active signal command channel;
- means, responsive to said actual actuator condition output and said modeled actuator condition output, for determining failure of one of said control signal command channels if said outputs vary by more than a predetermined amount, said determining means further providing an output indicative of which one of said active signal command channels has failed; and
- means, responsive to said determining means output indicative of an active signal command channel failure, for disconnecting said active signal command channel output from its associated controlling means and for connecting said model channel output to its associated controlling means, said disconnecting means, responsive to said determining means output indicative of model channel failure, for disconnecting said model channel.

19. A control system according to claim 18, including comparing means providing an output indicative of failure of a channel associated with an actuator condition output which differs from the other actuator condition outputs by more than a predetermined amount.

20. A control system according to claim 19, wherein said determining means, after determining a first failure, continues comparing the remaining three actuator condition outputs and providing a further output indicative of failure of a second channel, said second channel associated with one of said actuator condition outputs which differs by more than a predetermined amount from the others of said remaining three actuator condition outputs.

21. A control system according to claim 20, further including means for placing one of said actuator hydraulic sections in a passive-fail mode in response to a failure of two channels, wherein said disconnecting means provides a dual channel failure signal to said placing means when both channels associated with one actuator hydraulic section have failed.

22. A control system according to claim 21, wherein said disconnecting means provides dual channel failure signal to the placing means associated with one actuator hydraulic section have failed.

23. In an aircraft, a fly-by-wire lateral control system, comprising:

a symmetrical pair of lateral control surfaces, one on each wing of an aircraft;

a plurality of two/one fail-operational, electrohydraulic actuators, each of which is drivingly connected to a separate lateral control surface, each said actuator comprising a first hydraulic section and a second hydraulic section for redundant operation;

four separate hydraulic pressure supplies;

four separate electric control signal command channels;

each said actuator including control means controlling each of its said two hydraulic sections with a dedicated separate hydraulic pressure supply, so that each of said four hydraulic pressure supplies is connected to a separate one of the four hydraulic sections, said control means also controlling all four of said electric control signal command channels associated with each said actuator, with two of said channels serving as active channels for a first of said actuators and as model channels for the second actuator, and with the remaining two channels serving as model channels for the first actuator and as active channels for the second actuator; and each said control means comprising:

first rate controlling means, having two inputs, for controlling rate of movement of the first hydraulic section of its actuator and providing a rate indicative output;

second rate controlling means, having two inputs, for controlling rate of movement of the second hydraulic section of its actuator and providing a rate indicative output;

first channel means, responsive to a first disabling control signal and to an electrical input signal, for normally applying a first channel positioning signal to one of said inputs of said first rate controlling means;

second channel means, responsive to a second disabling control signal and to said electrical input signal, for normally transmitting a second channel positioning signal;

second channel transfer means, responsive to a second channel transfer signal, for connecting said second channel positioning signal to the other of said inputs of said first rate controlling means;

third channel means, responsive to a third disabling control signal and to said electrical input signal, for normally applying a third channel positioning signal to one of said inputs of said second rate controlling means;

fourth channel means, responsive to a fourth disabling control signal and to said electrical input signal, for normally applying a fourth channel positioning signal to an output;

fourth channel transfer means, responsive to a fourth channel transfer signal, for connecting said fourth channel positioning signal output to the other of said inputs of said second rate controlling means; and logic means for comparing the rate indicative outputs generated by said first and second rate controlling means and the second and fourth channel positioning signal outputs, each to the others, and for providing a disabling control signal when one of said outputs differs from the remaining three outputs by a predetermined amount;

(a) when said first rate indicative output is said differing output, said logic means providing said first disabling control signal to said first channel means, said logic means providing said second channel transfer signal to said second channel transfer means, said logic means including means for treating said first rate indicative output as said second positioning signal output when said second channel transfer signal is applied to said second channel transfer means;

(b) when said second channel means positioning signal output is said differing output, said logic means providing said second disabling control signal to said second channel means;

(c) when said second rate indicative output is said differing output, said logic means providing said third disabling control signal to said third channel means, said logic means providing said fourth channel transfer signal to said fourth channel transfer means, said logic means including means for treating said second rate indicative output as said fourth positioning signal output when said fourth channel transfer signal is applied to said fourth channel transfer means;

(d) when said fourth channel means positioning signal output is said differing output, said logic means providing said fourth disabling control signal to said fourth channel means; and said logic means further including means for comparing said remaining three outputs with each other and for providing further control signals in accordance with (a), (b), (c) and (d) when one of said remaining three outputs differs from the other two of said remaining three outputs by a predetermined amount.

24. A control system according to claim 23, wherein said logic means further includes means for comparing said remaining two outputs in the event of failure of two channels, and for providing a failure signal when one of said remaining two outputs differs from the other of said remaining two outputs by a predetermined amount.

25. A control system according to claim 24, further including bypass means for placing each of said actuator hydraulic sections in its passive failure mode when said first, second, third and fourth disabling control signals are indicative of failure of two channels associated with a single actuator hydraulic section or failure of three of the four channels in the system.

26. A control system according to claim 24, wherein said logic means includes:
first modeling means, responsive to said second channel positioning signal, for providing a first modeled rate indicative output which is an electronic model of the expected rate indicative output of said first rate controlling means having said second channel positioning signal applied as an input thereto; and
second modeling means, responsive to said fourth channel positioning signal, for providing a second modeled rate indicative output which is an electronic model of the expected rate indicative output of said second rate controlling means having a fourth channel positioning signal applied as an input thereto.

27. A control system according to one of claims 23 through 26, wherein said first disabling control signal and said second channel transfer signal comprise the same electrical signal, and said third disabling control signal and said fourth channel transfer signal comprise the same electrical signal.

28. A control system according to one of claims 23 through 26, wherein said means for treating in said logic means comprises:
first and second transfer monitor switches, said first transfer monitor switch associated with said first and second channel means and said second transfer monitor switch associated with said third and fourth channel means, respectively, each of said transfer monitor switches having two inputs connected to the outputs of their associated channel means, each of said transfer monitor switches including a control input, and an output, said first and second transfer monitor switch normally is reflective of the output of said first and second modeling means, respectively, and, upon application of a transfer monitor control input to either transfer monitor switch, the output of said transfer monitor switch will be reflective of the rate indicative output of said controlling means.

29. In an aircraft, a fly-by-wire type lateral control system, comprising:
a plurality of spoilers on each wing of the aircraft, each spoiler on each wing of the aircraft being operationally and symmetrically paired with a spoiler on the opposite wing of the aircraft and each such spoiler being operated by a single thread electrohydraulic actuator;
at least one aileron on each wing of the aircraft which is symmetrically related to an aileron on the opposite wing of the aircraft, each said aileron being operated by a dual actuator; and
control means including a plurality of independant hydraulic pressure supply lines and a plurality of independant electrical processing channels, for controlling the actuators for the spoilers and the ailerons such that a failure of a single hydraulic pressure line or a single electric control single processing channel will result in a loss of operation of a symmetrical pair of spoilers, but all ailerons will remain operational.

30. A control system according to claim 29, comprising at least four symmetrical pairs of spoilers, said control means being operable to maintain operation of at least three pairs of spoilers when there has been a failure of a single hydraulic pressure line or a single electric control signal processing channel.

31. A control system according to claim 30, comprising six symmetrical pairs of spoilers.

32. A control system according to claim 29, comprising a symmetrical pair of inboard ailerons and a symmetrical pair of outboard ailerons, and wherein in response to a failure of either two hydraulic pressure supply lines or two electric control signal processing channels the control means will maintain operational at least the inboard pair of ailerons operational.

33. A control system according to claim 32, comprising a least five symmetrical pairs of spoilers, and wherein in response to two hydraulic pressure supply line failures or two electric control signal processing channel failures the control means will maintain operational at least two pairs of spoilers.

34. A control system according to claim 29, comprising at least four symmetrical pair of spoilers, a symmetrical pair of inboard ailerons and a symmetrical pair of outboard ailerons, and wherein in response to a failure of three hydraulic pressure lines and/or three electric control signal processing channels the control means will maintain operational at least one of the ailerons.

35. A control system according to claim 34, wherein the aileron that is maintained operational is an inboard aileron.

36. A fly-by-wire lateral control system for an aircraft, comprising:
at least four independant pairs of spoilers symmetrically positioned on the wings of the aircraft;
a pair of outboard ailerons symmetrically arranged on the wings of the aircraft;
a pair of inboard ailerons symmetrically arranged on the wings of the aircraft;
a single thread electrohydraulic servoactuator connected to each spoiler, for positioning the spoiler;
a redundant electrohydraulic servoactuator connected to each aileron, for positioning the aileron, each servoactuator comprising two hydraulic sections;
control means for controlling the spoilers and the ailerons, including a separate hydraulic pressure supply line and a separate electric control signal processing channel connected with the servoactuators for each pair of spoilers, and a separate pair of hydraulic pressure supply lines connected with each redundant servoactuator, and a separate pair of electric signal processing channels connected with each redundant servoactuator, each said channel to function as an active control channel for a section of its redundant servoactuator, said control means operating in response to hydraulic pressure supply line failures and/or electric signal processing channel failures to disable the single thread servoactuators for the spoilers symmetrically, in pairs, and to continue operation of each aileron after one hydraulic pressure supply line failure and/or one electric signal processing channel failure, and to continue operation of at least two of the ailerons following two hydraulic pressure supply line failures and/or two electric signal processing channel failures.

* * * * *

UNITED STATES PATENT AND TRADEMARK OFFICE
CERTIFICATE OF CORRECTION

PATENT NO. : 4,472,780
DATED : September 18, 1984
INVENTOR(S) : Charles C. Chenoweth and Imre J. Takats It is certified that error appears in the above-identified patent and that said Letters Patent are hereby corrected as shown below:

Column 1, line 31, "surface" should be --surfaces--.

Column 3, line 58, "." should be --;--.

Column 4, line 34, ",", first occurrence, should be deleted.

Column 5, line 5, "asociated" should be --associated--.

Column 5, line 9, "as" should be --an--.

Column 6, line 20, "VA" should be --VS--.

Column 8, line 47, "to" should be --or--.

Column 9, line 11, "relative" should be --reflective--.

Column 9, line 49, "suplied" should be --supplied--.

Column 9, line 55, --monitors-- should be added following "transfer".

Column 14, line 31, "premissible" should be --permissible--.

Column 15, line 11, "good" should be --two--.

Column 19, line 36, "self-mounting" should be --self-monitoring--.

Column 25, second line of claim 13, "four" should be --fourth--.

Signed and Sealed this

Twenty-eighth Day of May 1985

[SEAL]

Attest:

DONALD J. QUIGG

Attesting Officer  Acting Commissioner of Patents and Trademarks